United States Patent [19]

Hakkaku et al.

[11] Patent Number: 4,962,386

[45] Date of Patent: Oct. 9, 1990

[54] COLOR IMAGE RECORDING SYSTEM USING MULTI-LAYER, HEAT-SENSITIVE RECORDING MATERIAL

[75] Inventors: Kunio Hakkaku; Shinichi Kaida, both of Kanagawa, Japan

[73] Assignee: Fuji Photo Film Co., Ltd., Kanagawa, Japan

[21] Appl. No.: 333,947

[22] Filed: Apr. 6, 1989

[30] Foreign Application Priority Data

Apr. 7, 1988 [JP] Japan .................................. 63-85724
May 27, 1988 [JP] Japan .................................. 63-129570
May 27, 1988 [JP] Japan .................................. 63-129571
May 27, 1988 [JP] Japan .................................. 63-129572

[51] Int. Cl.[5] ........................ G01D 9/00; G01D 15/10

[52] U.S. Cl. ................................ 346/1.1; 366/76 PH; 400/120

[58] Field of Search ........................... 346/76 PH, 1.1; 400/120

[56] References Cited

U.S. PATENT DOCUMENTS 4,857,941 8/1989 Kaida ............................ 346/76 PH

FOREIGN PATENT DOCUMENTS 40-20151 9/1965 Japan .
49-114431 10/1974 Japan .
503640 1/1975 Japan .
504092 1/1975 Japan .
60-68875 4/1985 Japan .
60-184483 8/1985 Japan .
63-257651 4/1987 Japan .

*Primary Examiner*—Bruce A. Reynolds
*Assistant Examiner*—Huan Tran
*Attorney, Agent, or Firm*—Sughrue, Mion, Zinn, Macpeak & Seas

[57] ABSTRACT

An image recording apparatus for recording an image on a heat-sensitive recording material which has on both sides of a transparent support member a plurality of transparent heat-sensitive color developing layers that develop respective colors in different hues from each other. The image recording apparatus includes a reversing device for turning the heat-sensitive recording material upside down, after the transparent heat-sensitive color developing layer on one side has been heated to develop the color. Accordingly, color development for both sides of the heat-sensitive recording material can be automatically performed.

An image recording method for recording an image by a recording head on a heat-sensitive recording material which has two sorts of dye layers on one side and one sort of dye layer on the other side. The image recording method comprises the steps of color-developing one of the said two sorts of dye layers on one side, irradiating light onto the color-developed dye layer to fix the developed color, turning the heat-sensitive recording material upside down, while irradiating the light onto the color-developed layer, and then color-developing the dye layer on the other side.

Accordingly, a longer fixing time can be set to ensure the positive fixing.

20 Claims, 20 Drawing Sheets

COLOR IMAGE RECORDING SYSTEM USING MULTI-LAYER, HEAT-SENSITIVE RECORDING MATERIAL

BACKGROUND OF THE INVENTION

1. Field of the Invention

The present invention relates to image recording apparatus and method of recording an image on a heat-sensitive or thermosensible recording material which has on both sides of a transparent support member a plurality of transparent heat-sensitive color developing layers that develop respective colors in different hues from each other.

2. Description of Prior Art

A heat-sensitive recording method is now known as one of recording an image on recording paper by means of a heating element. Such a heat-sensitive recording method employs a heat-sensitive recording material having a coupler or color former and developer coated on a support member such as paper or synthetic paper, and records an image through the process of heat-processing the heat-sensitive recording material by a thermal head. This type heat-sensitive recording method has recently become more relevant acceleratingly in the fields of monochromatic facsimile devices and printers because of advantages of; (1) no need of development, (2) allowing use of paper that has nature close to normal paper in case of using paper as a support member, (3) easy handling, (4) high color-development density, (5) simple and inexpensive recording apparatus, and (6) less noise than dot printers or so during recording, etc.

In those recording fields, with rapid development of the information industry there has been increased a demand to readily obtain a color hard copy from terminal units of information equipments including computers and facsimile devices. However, multi-coloration of a heat-sensitive recording material requires to incorporate a plurality of color development mechanisms, corresponding to the number of colors to be developed, on the same support member, and control the respective color development mechanisms for separate reactions. In spite of a great deal of efforts devoted in the past, there have not yet been achieved the satisfactory results in hues and separation of the developed colors.

Meanwhile, an opaque support member such as paper or synthetic paper has usually been employed as a support member for the heat-sensitive recording material. This is intended to simply read the color-developed image, as a reflected image, from one side of the support member.

Examples of using a transparent support member for the heat-sensitive recording material are disclosed in Japanese Patent Publication No. 40-20151, and Japanese Patent Application No. 60-68875 and No. 60-184483. These are aimed to obtain a high-contrast image or high-grade quality with an excellent gloss by looking at the heat-recorded image from the side of the transparent support side. There is also proposed such an invention that heat-sensitive recording layers developing different hues from each other are applied on both side of a transparent support member to obtain the color-developed image of two-or multi-colors (see Japanese Patent Application Laid-Open No. 49-114431, No. 50-3640 and No. 60-4092).

However, the heat-sensitive color developing layer of the proposed invention contains a coupling or color forming component and a developing component which are dispersed therein simply in the solid form. In practice, therefor, light scattering makes the color developing layer itself opaque, and the intended multicolor image with sharp color separation cannot be obtained. The invention disclosed in the above Japanese Patent Laid-Open Application No. 60-4092 states the technique of solving the respective components and then coating the resultant solution into the same layer for the purpose of improving transparency of the heat-sensitive color developing layer. But, in this case, the respective components tend to easily develop colors even before printing, thereby resulting in the so-called fogging. Accordingly, the number of separatable colors are small and hence the disclosed heat-sensitive layer is unsatisfactory as a munticolor recording material in its specific nature.

In view of the above, the applicant has previously proposed a multicolor heat-sensitive recording material which includes on both sides of a transparent support plate a plurality of color developing layers that are substantially transparent and develop different hues from each other, and hence which can provide a remarkably excellent image through heat-sensitive color development.

Thus, that heat-sensitive recording material makes it possible to obtain a multicolor image of excellent hue, good color separation and improved image retainment, that could not be obtainable with any prior heat-sensitive recording systems. Also, the image can optionally be provided as either a transmitted image or a reflected image.

This type heat-sensitive recording paper has the color developing layers on both sides thereof, so these both sides have to be heated by thermal heads. Where the color developing multilayers are coated on either side, it is required to first heat the uppermost layer (the layer closest to the surface) for color development with such amount of heat that will not heat-affect the underlying layer(s), and then carry out heating process of the remaining layer(s) after fixing the uppermost color-developed layer.

The basic sequence of such image recording will be described below with reference to FIG. 13.

As shown in FIG. 13(A), a heat-sensitive recording material 10 comprises a polyester film 102 (hereafter referred to as PET), as a support member, which has on either side thereof a magenta dye layer 104 (hereinafter referred to as M-dye layer) and a yellow dye layer 106 hereinafter referred to as Y-dye layer formed on the M-dye layer 104. The support member also has, on the other side thereof, a cyan dye layer 108 hereinafter referred to as C-dye layer. All of these dye layers are transparent. The Y-dye layer 106 is of the photo-fixing type. Thus, the Y-dye layer 106 has such nature that it is fixed upon irradiation of light with wavelength of 400 nm from a light source 109, and remains unchanged in color since then even under subsequent heating. A recording head 110 is disposed above the heat-sensitive material 10.

Initially, in FIG. 13(A), the Y-dye layer 106 is heat-processed by the thermal head 110. At this time, the applied amount of heat is selected to the extent that the M-dye layer 104 below the Y-dye layer 106 will not make color development under such heating. Only the Y-dye layer 106 is thereby color-developed.

Then, in FIG. 13(B), light with a wavelength of about 400 nm is irradiated to the support member from the Y-dye layer 106 side, as illustrated. The Y-dye layer 106 is thereby fixed and remain unchanged in color even under subsequent heating.

In FIG. 13(C) the M-dye layer 104 is heat-processed with the larger amount of heat than that applied for heating Y-dye layer 106. This causes the M-dye layer 104 to develop the color.

In FIG. 13(D), the heat-sensitive recording paper 10 is turned upside down, and in FIG. 13(E), the C-dye layer 108 is heat-processed. Where another recording head 112 (see imaginary lines in FIG. 13(A)) is provided below the heat-sensitive recording material 10, the C-dye layer 108 can be heat-processed without reversing the recording paper 10. In either case, the C-dye layer 108 develops the color by applying thereon such amount of heat that will not affect the M-dye layer 104 disposed on the opposite side with the PET 102 therebetween.

As present, however, there has not yet been developed an image recording system which can automatically process the above image recording sequence. As a requirement to implement an image recording system for recording an image on a multicolor heat-sensitive recording material, the heat-sensitive recording material must be positioned accurately to record the same single image in three separate stages for reproducing the color without any shifts or fogging. So long as that requirement cannot be processed automatically, there remains difficulty in achieving the high-speed processing. If the recording heads 110, 112 are disposed one on either side of the heat-sensitive recording material 10 as shown in FIG. 13(A), the operation to reverse the heat-sensitive recording material as shown in FIG. 13(D) can be dispensed with. But such arrangement is not preferable in a practical sense because of an increase in both the number of parts and the size of the apparatus, Where the heat-sensitive recording material includes a white base coated on the Y-dye layer, a longer interval has to be taken before heat-processing the M-dye layer, resulting in poor operability. The reason of applying the white base is to prevent see-through view of the texture of the heat-sensitive recording material on its rear side and keep the image from losing its clearness. Incidentally, any white pigment may be mixed into the heat-sensitive layer in place of applying the white base separately from the heat-sensitive layer.

SUMMARY OF THE INVENTION

Taking into account the foregoing, it is an object of the present invention to provide image recording apparatus and method which enable to automatically heat-process respective color developing layers coated on both sides of a transparent support member, and also enable to meet the practical requirement such as high-speed processing.

The image recording apparatus according to the present invention includes reversing means for turning a heat-sensitive recording material upside down. Accordingly, after color-developing a transparent heat-sensitive color developing layer on one side of the heat-sensitive recording material, this heat-sensitive recording material can be turned upside down using the reversing means to color-develop a transparent heat-sensitive color developing layer on the other side of the heat-sensitive recording material.

As one preferred form, the present invention resides in an image recording apparatus for recording an image on a heat-sensitive recording material which has on both sides of a transparent support member a plurality of transparent heat-sensitive color developing layers that develop respective colors in different hues from each other. The image recording apparatus comprises a rotatable member around which the heat-sensitive recording material is wound; a recording head located in opposition the rotatable member for heat-processing the color developing layers on the heat-sensitive recording material to develop respective colors; and reversing means for turning the heat-sensitive recording material upside down.

With this invention, the heat-sensitive recording material is wound around the rotatable member and, in this state, one side of the heat-sensitive recording material is heat-processed by the recording head. Then, after turning the heat-sensitive recording material upside down by the reversing means, the other side of the heat-sensitive recording material is heat-processed.

Thus, since the heating process is always carried out in the state that the heat-sensitive recording material is wound around the rotatable member, there occurs no positional shifts, thereby enabling to develop respective colors in predetermined locations. The present apparatus is also valuable in a practical sense, because the high-speed processing becomes possible and the multicolor heat-sensitive recording material can be applied effectively by fully taking the advantage thereof. Further, since the transparent heat-sensitive color developing layers on both side of the heat-sensitive recording material are heat-processed in due sequence by reversing the heat-sensitive recording material, only a single recording head is required and hence the number of parts can be reduced.

An image recording method according to the present invention resides in a method of recording an image by a single recording head on a heat-sensitive recording material which as a first dye layer and a second dye layer formed on the first dye layer on one side of a transparent support member and a third dye layer on the other side thereof. The method is characterized by the following step: placing one side of the support member opposite to the recording head for heat-processing the second dye layer; irradiating light of predetermined wavelength onto the heat-sensitive recording material to fix the developed color of the second dye layer; turning the heat-sensitive recording material upside down, while continuing irradiation of the light, to place the other side of the support member opposite to the recording head for heat-processing the third dye layer; and turning the heat-sensitive recording material upside down again after the heating process of the third dye layer, to place one side of the support member opposite to the recording head for heat-processing the first dye layer.

With this invention, the heat-sensitive recording material is wound around the rotatable member and, in this state, the second dye layer on one side is heat-processed by the recording head.

By carrying out the heating process of the respective dye layers following the above sequence, it becomes possible to take a longer period of time (interval) between the heating process of the first dye layer and the heating process of the second dye layer, while continuing to irradiate the light of predetermined wavelength onto the second dye layer for the interval. This enables the reliable and high-speed image recording process without changing the color of the second dye layer during the heating process of the first dye layer.

In addition, the above sequence is particularly effective in the case of employing a white base or the like, as stated in the "Description of Prior Art", which requires to take a longer fixing time. Included in a preferable white pigment is tark, calcium carbonate, calcium sulfate, magnesium carbonate, magnesium hydroxide, alumina, synthetic silica, titanium oxide, barium sulfate, kaolin, calcium silicate, urea resin, etc.

DESCRIPTION OF PREFERRED EMBODIMENTS

Figure 1:
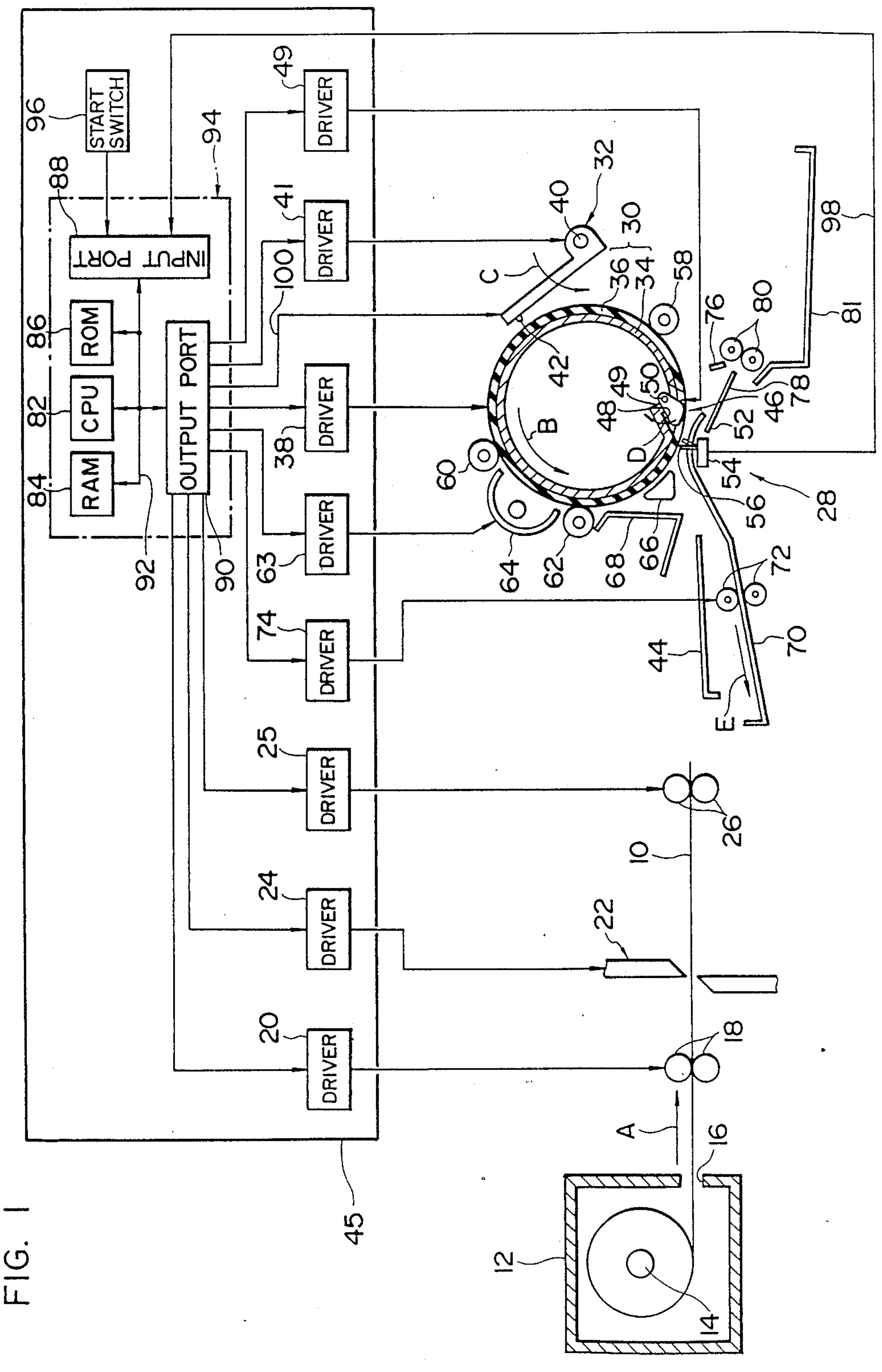
FIG. 1 is a schematic view showing a configuration of an image recording apparatus according to a first embodiment of the present invention.

FIG. 1 outlines a construction of an image recording apparatus according to a first embodiment of the invention.

A heat-sensitive recording material 10 has its succeeding portions accommodated in a magazine 12 and wound around a reel 14, disposed in the magazine 12, in the form of a rolled web. An intermediate portion of the heat-sensitive recording material 10 is withdrawn through a let-out port 16 formed in the magazine 12, and is held between a pair of feed rollers 18. The feed rollers 18 are rotated by drive power from a driver 20 to feed the heat-sensitive recording material 10 in the direction of an arrow A in FIG. 1.

Figure 13:
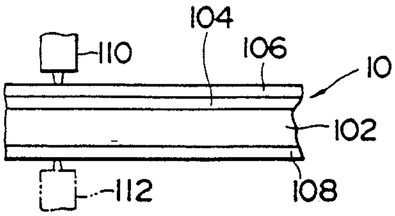
FIGS. 13(A)–13(E) are explanatory views showing the color development process of a multicolor heat-sensitive recording material applied to the present invention.
Figure 13:
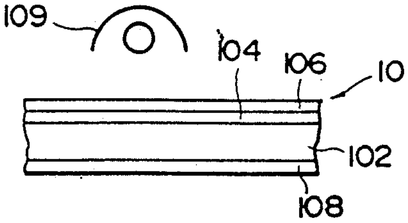
Figure 13:
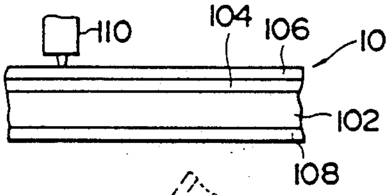
Figure 13:
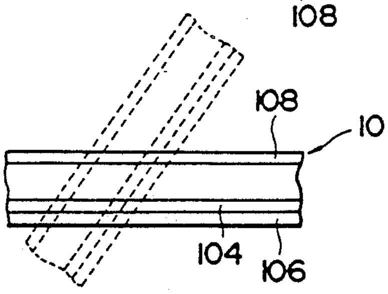
Figure 13:
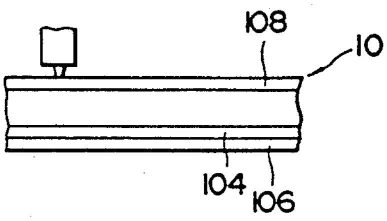

As stated in the "Description of Prior Art", the heat-sensitive recording material 10 is constructed such that its support member has on one side a M-dye layer 104 as a first dye layer and a Y-dye layer 106 as a second dye layer, and on the other side a C-dye layer 108 as a third dye layer (see FIG. 13). Incidentally, a PET 102 is employed as a support member in this embodiment so that the entire structure is transparent.

Downstream of the feed roller 18, a cutter 22 is disposed and actuated by drive power from a driver 24 to cut the heat-sensitive recording material 10 into a desired length. The heat-sensitive recording material 10 thus cut is held between another pair of feed rollers 26, rotated by drive power from a driver 25, for being further fed and guided into a heat processing section 28.

The heat processing section 28 includes a support drum 30, as a rotatable member, and a thermal head 32 of the line type, as a recording head. The heat-sensitive recording material 10 is heated by the thermal head 32 in the state it is wound around the support drum 30. The support drum 30 is formed by a cylindrical body 34 of metal, and has an elastic member 36 rolled over the outer circumference thereof. The support drum 30 is rotated at a constant speed by drive power from a driver 38 in the direction of an arrow B in FIG. 1, so that the heat-sensitive recording material 10 wound around the support drum 30 is brought into a position facing the thermal head 32 successively.

The thermal head 32 has its base end pivotally supported to a machine frame (not shown) through a shaft 40, and is rotated about the shaft 40 by drive power from a driver 41 in the direction of an arrow C in FIG. 1 or in the opposite direction, so that a heating element 42 disposed at a distal end of the thermal head 32 is moved into contact with or away from the heat-sensitive recording material 10 wound around the support drum 30. Upon the heating element 42 contacting with the heat-sensitive recording material 10, an image signal 100 is output from a control device 45 to the heating element 42, to thereby form an image on the heat-sensitive recording material 10 under heating in response to the image signal 100.

Having been fed to the heat processing section 28 by the feed rollers 26, the heat-sensitive recording material 10 is now guided in its feed direction by a set of guide plates 44, 68, 70 for being led to a recess 48 which constitutes a part of a retainer 46 provided in the outer circumference of the support drum 30. In the recess 48, a latch pawl 52 is pivotally supported on a shaft 50 extending parallel to a rotary shaft of the support drum 30, the latch pawl 52 constituting the retainer 46 jointly with the recess 48. At the time the leading end of the heatsensitive recording material 10 guided by the guide plate 44 gets into the recess 48, the latch pawl 52 is rotated about the shaft 50 by drive power from a driver 49 in the direction of an arrow D in FIG. 1 to grasp the leading end of the heat-sensitive recording material 10. Once grasped by the latch pawl 52, the heat-sensitive recording material 10 is successively wound over the outer circumference of the support drum 30 as it rotates.

The timing, at which the latch pawl 52 grasps the heat-sensitive recording material 10, is determined by a limit switch 54 disposed midway a feed path of the heat-sensitive recording material 10. More specifically, when the heat-sensitive recording material 10 reaches a position of the limit switch 54, an actuator 56 of the limit switch 54 is interfered with the heat-sensitive recording material 10 to switch the contact (in this embodiment, the limit switch 54 of the normal-open type is employed so that it is turned on upon interference with the heat-sensitive recording material 10). An on (high-level)/ off (low-level) signal from the limit switch 54 is supplied to the control device 45 which triggers control to actuate the latch pawl 52 (i.e. to rotate it in the direction of the arrow D in FIG. 1) after the elapse of a predetermined time dependent on a feed speed of the heat-sensitive recording material 10 (i.e. after the leading end of the heatsensitive recording material 10 has struck against the bottom of the recess 48). Thus, the relative positional relationship between the heat-sensitive recording material 10 and the support drum 30 remains constant at all times to ensure accurate positioning of the former, during the state that the heat-sensitive recording material 10 is being grasped by the latch pawl 52.

Around the support drum 30, there are disposed idler rollers 58, 60, 62 in plural positions (three positions in this embodiment). These idler rollers 58, 60, 62 serve, jointly with the support drum 30, to keep the heat-sensitive recording material 10 wound over the outer circumference of the support drum 30 in a close contact state. On the downstream side relative to the heating position of the heat-sensitive recording material 10 by the thermal head 32 in the direction of rotation of the support drum 30, there is disposed a light source 64 (between the idler rollers 60 and 62) connected to the control device 45 through a driver 63 for irradiating light onto the heat-sensitive recording material 10. The light has the wavelength of 400 nm for fixing the Y-dye layer 106 (see FIG. 13) of the heat-sensitive recording material 10. Thus, this embodiment is so arranged as to make the support drum 30 turn twice successively once it starts rotation. During the first turn of the heat-sensitive recording material 10, the Y-dye layer 106 is heat-processed by the thermal head 32 and fixed immediately thereafter.

During the next, i.e., second, turn of the support drum 30, the M-dye layer 104 (see FIG. 13) formed below the Y-dye layer 106 is heat-processed. The amount of heat applied from the heating element 42 is controlled by the control device 45 to be "weak" during the first turn of the support drum 30 to keep the underlying M-dye layer 104 from any heat effects, and "strong" during the second turn thereof.

After the heating process of the Y-dye layer 106 and the M-dye layer 104, the heat-sensitive recording material 10 is released from its grasped state by the retainer 46 and, in a region downstream of the idler roller 62, advanced by virtue of its own elastic force in the tangential direction of the support drum 30 for being guided into between the guide plates 66 and 68. In this connection, the support drum 30 is controlled to be stopped at its initial position (i.e., when the retainer 46 is positioned at the bottom as shown in FIG. 1).

The heat-sensitive recording material 10, moving downwardly while being guided between the guide plates 66 and 68, is now changed its moving direction along a guide plate 70 and held between a pair of feed rollers 72. The feed rollers 72 are rotated by drive power from a driver 74 to transfer the heat-sensitive recording material 10 through a predetermined distance in the direction of an arrow E in FIG. 1, and thereafter are reversed in rotation to transfer the heat-sensitive recording material 10 toward the support drum 30 (oppositely to the direction of the arrow E) with the trailing end of the material 10 now directed ahead. Thus, the heat-sensitive recording material 10 is turned upside down and grasped again by the retainer 46. In this grasped state, the heat-sensitive recording material 10 is rotated together with the support drum 30 to heat-process the C-dye layer 108 (see FIG. 13) by the thermal head 32. After the heating process of the C-dye layer 108, the retainer 46 is controlled to release the heat-sensitive recording material 10 from its grasped state at the point in time when the material 10 has passed the guide plate 66, so that the heat-sensitive recording material 10 is guided into between guide plates 76 and 78 and led into a take-up tray 81 through a pair of feed rollers 80.

The control device 45 includes a microcomputer 94 comprising a CPU 82, RAM 84, ROM 86, input port 88, output port 90, and buses 92 such as data buses and control buses interconnecting those components. A start switch 96 is connected to the input port 88. Operating the start switch 96 starts to withdraw the heat-sensitive recording material 10 from the magazine 12, followed a series of heat processing steps. A signal line 98 from the limit switch 54 is also connected to the input port 88.

Connected to the output port 90 are the cutter 22, support drum 30, thermal head 32, latch pawl 52, light source 64, and feed rollers 18, 26, 72 through the drivers 24, 38, 41, 49, 63, 20, 25 and 74, respectively, for being controlled in their operations. The signal line 100 for supplying the image signal to the thermal head 32 is also connected to the output port 90.

Figure 2:
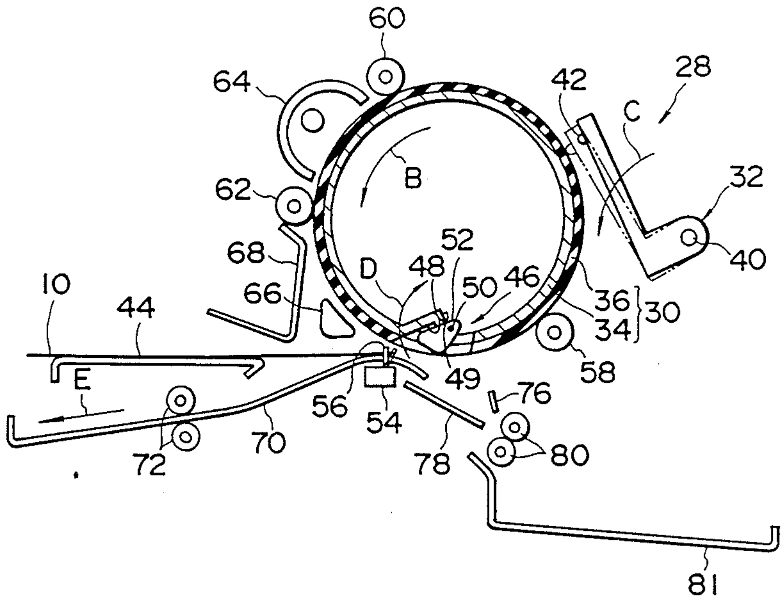
FIGS. 2(A)–2(H) are explanatory views showing successive steps of the heating process according to the first embodiment.
Figure 2:
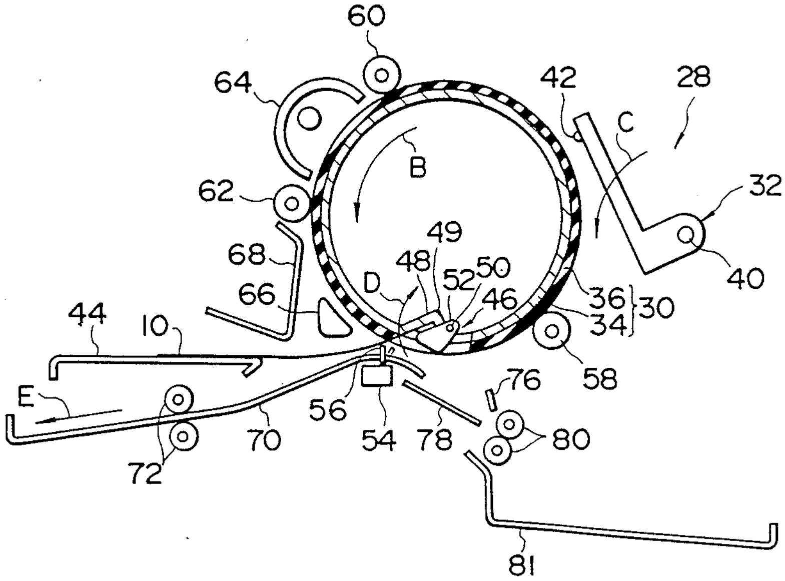
Figure 2:
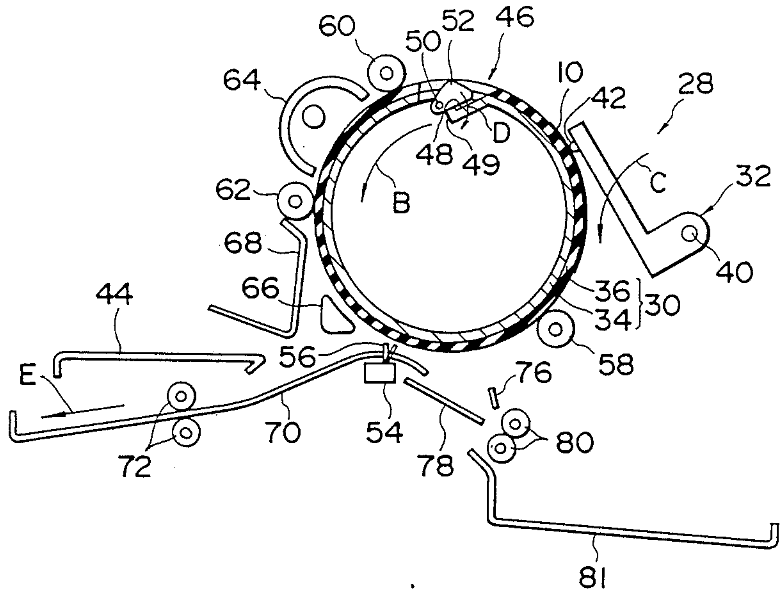
Figure 2:
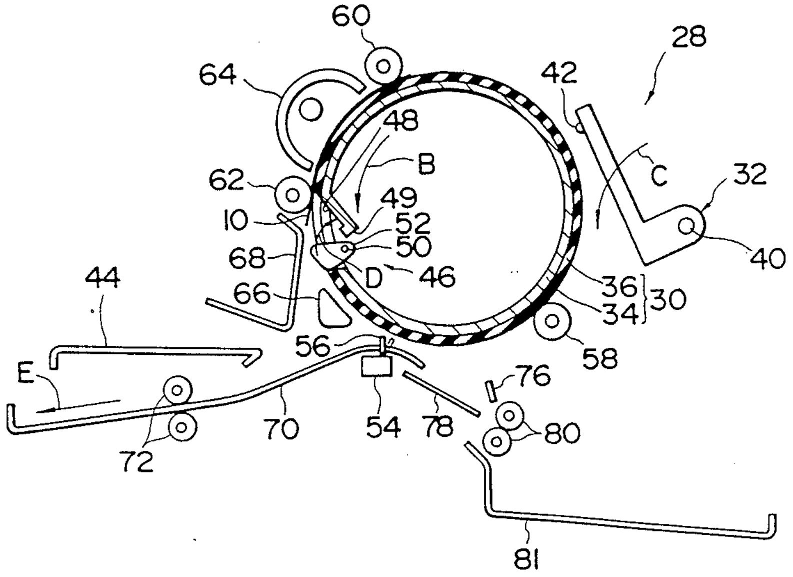
Figure 2:
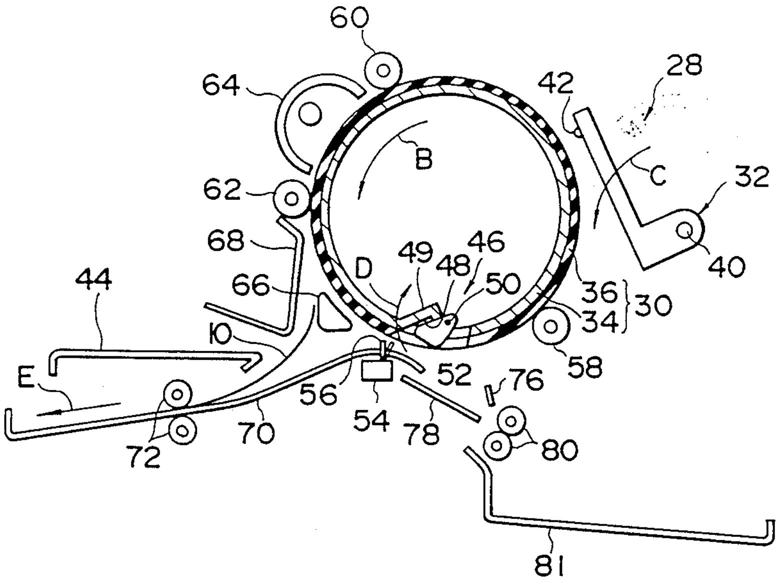
Figure 2:
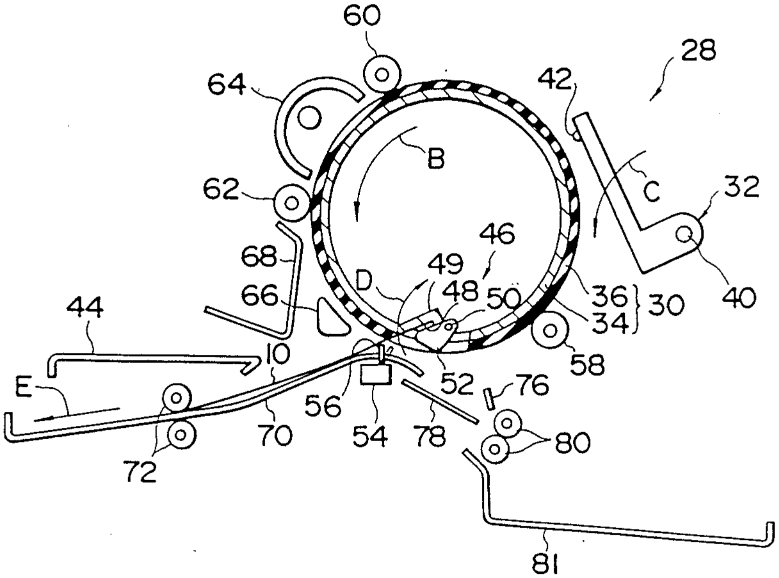
Figure 2:
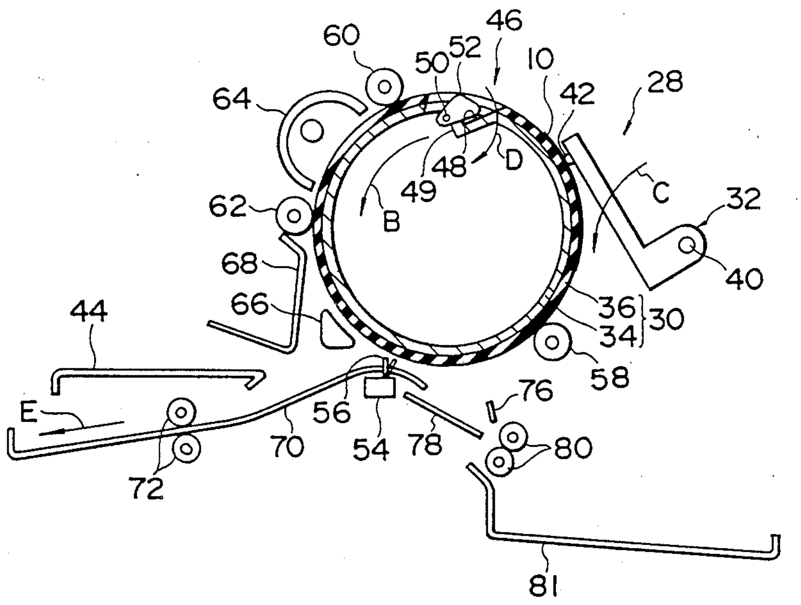
Figure 2:
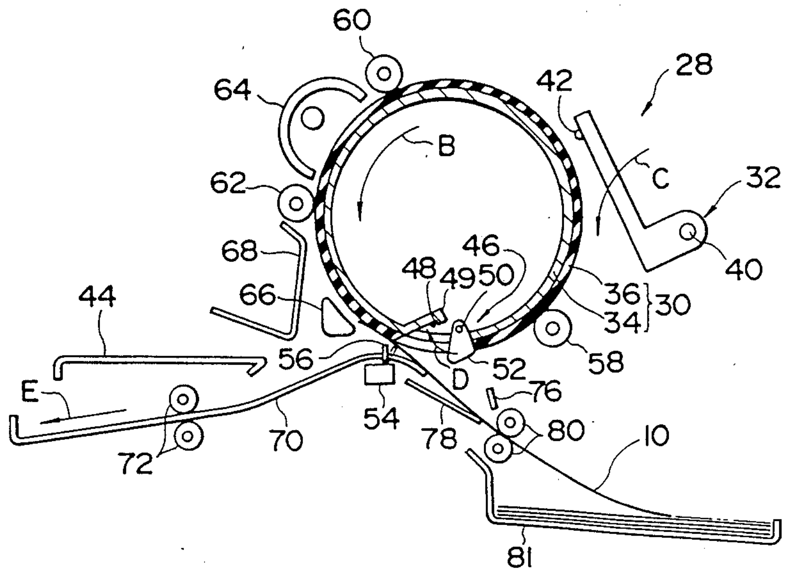
Figure 3:
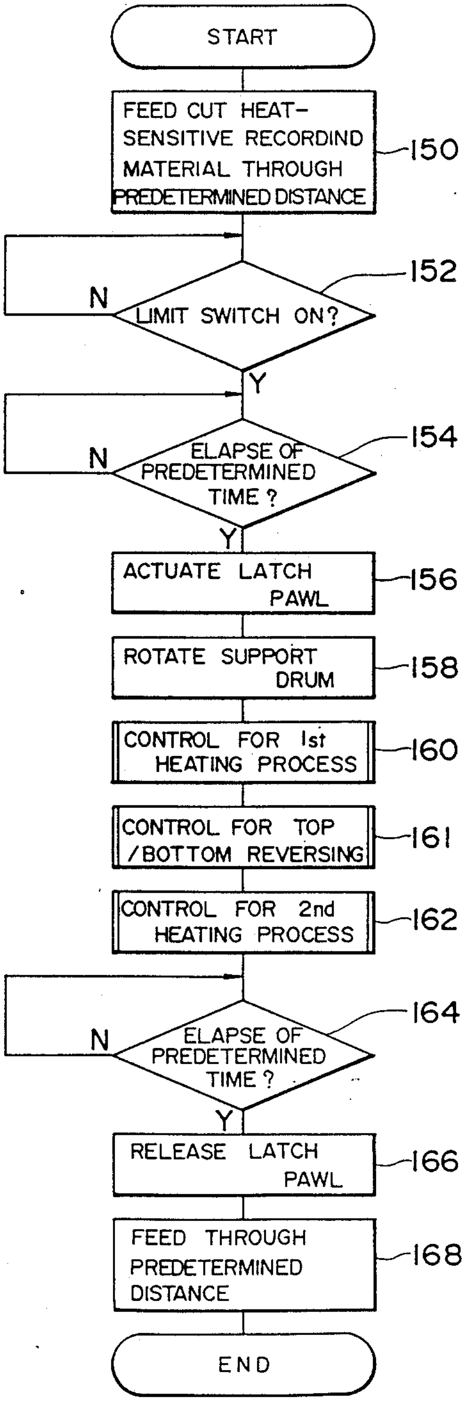
FIG. 3 is a flowchart for control of the first embodiment.

Operation of this embodiment will be described below with reference to FIGS. 2(A)–2(H) which are explanatory views for the heating process and FIG. 3 which shows a flowchart for control thereof.

As shown in FIG. 2(A), when the heat-sensitive recording material 10 (see the position indicated by a solid line in FIG. 2(A)) is fed through a predetermined distance in a step 150 by drive power of the feed rollers 18 (see FIG. 1), while being guided by the guide plate 44, and reaches the position indicated by an imaginary line in FIG. 2(A), it comes into contact with the actuator 56 of the limit switch 54. Here, a step 152 determines as to whether or not the limit switch 54 has been turned on. In response to turning-on of the limit switch 54, a high-level signal is applied to the input port 88. In a next step 154, it is determined whether or not a predetermined time has elapsed after the above input of the high-level signal. If so, the the latch pawl 52 is rotated in the direction of the arrow D as shown in FIG. 2(B) (step 156). During the elapse of the predetermined time, the heat-sensitive recording material 10 gets into the recess 48 of the support drum 30 such that its leading end is brought into abutment with a stopper 49 for being positively grasped by the latch pawl 52.

After the leading end of the heat-sensitive recording material 10 has been grasped by the latch pawl 52, as shown in FIG. 2(C), the support drum 30 starts rotation in a step 158 in the direction of arrow B in FIG. 2(C) (i.e., first turn). A next step 160 carries out control for the first heating process as follows. More specifically, when the retainer 46 has passed the heating element 42 of the thermal head 32, a drive signal is issued from the output port 90 through the driver 41 to rotate the thermal head 32 about the shaft 40 in the direction of the arrow C in FIG. 2(C), thereby making the heating element 42 contact with the heat-sensitive recording material 10. Thereafter, the support drum 30 is rotated with the heating element 42 kept contact with the heat-sensitive recording material 10, and the image signal is output to the heating element 42 successively in match with the continued rotation of the support drum 30.

At this time, the heating element 42 is set to produce the "weak" amount of heat for heating the heat-sensitive recording material 10 in response to the image signal so that only the Y-dye layer 106 is color-developed. After the heating process by the heating element 42, the thermal head 32 is rotated about shaft 40 oppositely to the direction of the arrow C in FIG. 2(C), causing the heating element 42 to move away from the heat-sensitive recording material 10.

When the retainer 46 has passed the idler 60, the light with wavelength of 400 nm is irradiated from the light source 64 onto the image surface of the heat-sensitive recording material 10. The Y-dye layer 106 is thereby fixed and remains unchanged in color since then even under subsequent heating.

After completion of the first turn, the support drum 30 continuously enters the second turn for heat-processing the M-dye layer 104. More specifically, except that the amount of heat produced by the heating element 42 is switched to a "strong" level, the heating process takes place in a like manner to that for the Y-dye layer 106, so that the heat-sensitive recording material 10 is heated in response to the image signal to color-develop only the M-dye layer 104. At this time, the Y-dye in the upper layer exhibits no change in color because it has already been fixed. Also, since there occurs no change in the relative positional relationship between the heat-sensitive recording material 10 and the support drum 30, the Y- and M-dye images can accurately develop their colors without causing any color shifts. After the heating process of the M-dye layer, the heat-sensitive recording material 10 passes the irradiation position from the light source 64. But, the light source 64 only serves to fix the Y-dye layer, so it may be lit on or off at this time. Preferably, the light source 64 is lit off for energy saving.

When the retainer 46 has passed the idler roller 62 after the heating process of the Y- and M-dye layers during two turns of the support drum 30, as shown in FIG. 2(D), a step 161 carries out control for the top/bottom reversing process as follows. More specifically, the latch pawl 52 releases the heat-sensitive recording material 10 from its grasped state, so that the heat-sensitive recording material 10 gets out of the recess 48 by virtue of its own elastic force and advances in the tangential direction of the support drum 30. While moving in the tangential direction, the heat-sensitive recording material 10 is guided by the guide plates 66, 68 to pass therebetween, and then moved toward the feed rollers 72 along the guide plate 70.

As shown in FIG. 2(E), the heat-sensitive recording material 10 held between the pair of feed rollers 72 is once placed on the guide plate 70 by drive power of the feed rollers 72. In this state, the heat-sensitive recording material 10 is located completely away from the support drum 30. In parallel to the above, the support drum 30 is further rotated to its original position (i.e., the position as shown in FIG. 2(A)) and stopped there.

Once the heat-sensitive recording material 10 is stopped, the feed rollers 72 are reversed in rotation so that the heat-sensitive recording material 10 is moved again toward the recess 48 of the support drum 30 with its end, which has been the trailing end in the direction of feeding, now directed ahead, as shown in FIG. 2(F). In a manner like to the above, when the heat-sensitive recording material 10 comes into contact with the actuator 56 of the limit switch 54, the latch pawl 52 is rotated about the shaft 50 in the direction of the arrow D in FIG. 2(F) after the elapse of a predetermined time, to thereby grasp the heat-sensitive recording material 10 having advanced into the recess 48. Thus, the heat-sensitive recording material 10 is grasped in such a state that it is turned upside down relative to the state shown in FIG. 2(B).

As shown in FIG. 2(G), the heat-sensitive recording material 10 turned upside down is then subjected to control for the second heating process in a step 162 as follows. First, the heat-sensitive recording material 10 is fed along the outer circumference of the support drum 30 while being wound around same. As soon as the retainer 46 passes the heating element 42, the thermal head 32 is rotated in the direction of the arrow C in FIG. 2(G) to make the heating element 42 contact with the heat-sensitive recording material 10, so that the material 10 is heat-processed in response to the image signal issued from the output port 90. At this time, the image signal is issued conversely in time with respect to that having been issued for the heating process of the Y-dye layer 106 and the M-dye layer 104. In other words, during the heating process of the C-dye layer 108, the image signal must be reversed in the time relationship for match of the resulting images, because the heat-sensitive recording material 10 has been turned upside down and the direction of feeding thereof has also been reversed relative to the case of heat-processing the Y-dye layer 106 and the M-dye layer 104. The C-dye layer 108 is thus heat-processed to develop the color of C-dye. The foregoing is the control processed in the step 162. In parallel to that the thermal head 32 is rotated oppositely to the direction of the arrow C after the heating process by the heating element 42, the control process goes to a next step 164.

Upon the elapse of a predetermined time after the heating element 42 of the thermal head 32 has been moved away from the heat-sensitive recording material 10 (step 164), as shown in FIG. 2(H), the retainer 46 having passed the guide plate 66 releases the heat-sensitive recording material 10 from its grasped state in a step 166, allowing the material 10 to be fed into between the guide plates 76 and 78 as the support drum 30 rotates. After moving between the guide plates 76 and 78, the heat-sensitive recording material 10 is held between a pair of feed rollers 80 and then fed by the feed rollers 80 through a predetermined distance in a step 168 for being sent out into the take-up tray 81. The entire heating process of one sheet of heat-sensitive recording material 10 is thereby completed to provide a color hard copy.

In the above embodiment, since the support drum 30 is rotated at a constant speed, the first and second heating process and the top/bottom reversing process are controlled sequentially based on the present time schedule. But, those processes may be stepped in response to outputs from sensors which are installed in association with the respective process stations. Also, any color shifts between the M-dye and C-dye can more certainly be eliminated by placing an optical sensor between the heating element 42 and the idler roller 58, making the elastic member 36 white, recording a marker in color of the M-dye developed by the heating element 42 on the material film after recording of the M-dye, and then detecting the marker by the optical sensor before recording of the C-dye.

Next, a second embodiment of the present invention will be described. This embodiment is different from the first embodiment only in the heat processing steps of the heat-sensitive recording material 10, and essentially identical thereto in the construction and operation of respective components, such as parts and members, of the image recording apparatus.

Accordingly, the second embodiment will be described with reference to FIGS. 1 and 2 relating to the first embodiment and FIG. 4 which shows a specific new flowchart for control.

Figure 4:
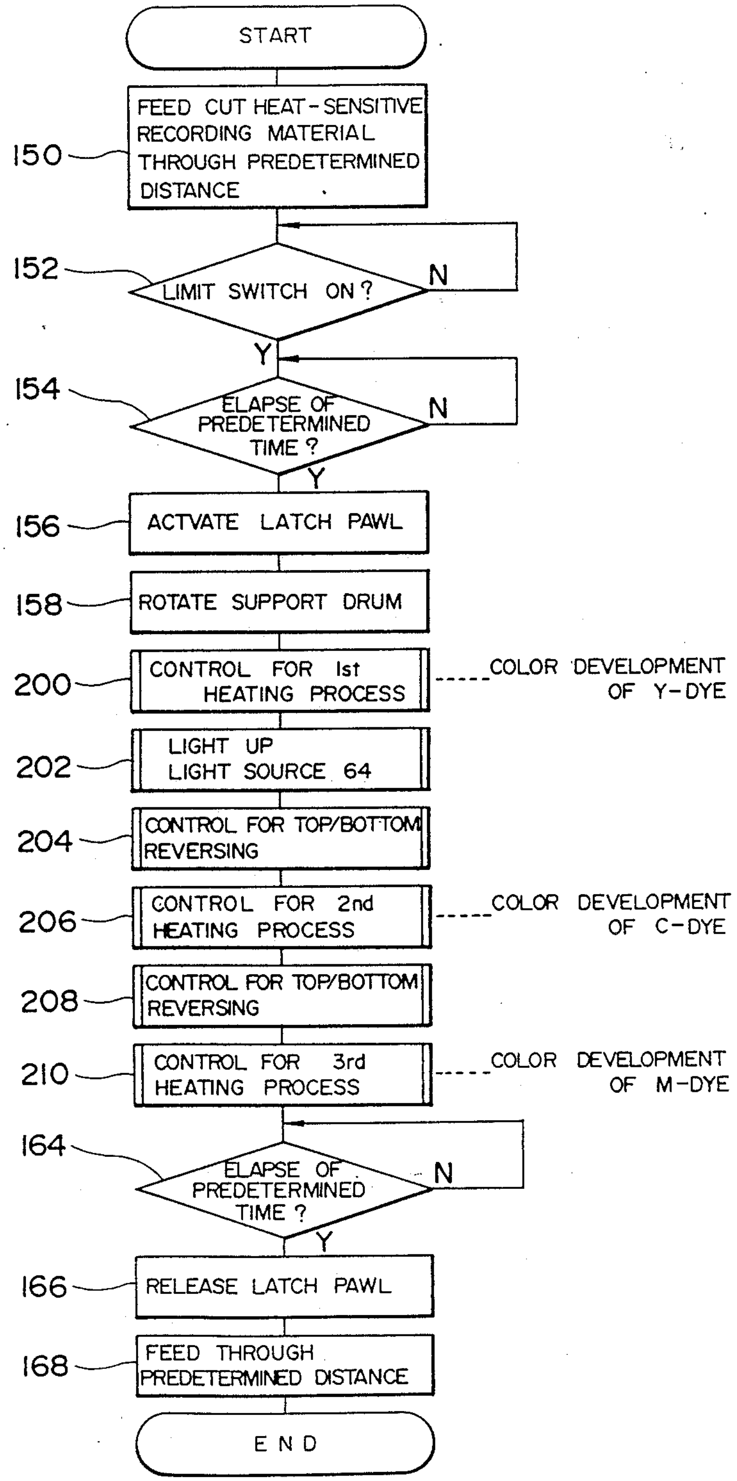
FIG. 4 is a flowchart for control of a second embodiment.

In FIG. 4, the steps denoted by the same numerals as those in the first embodiment carry out the same processes as those in the first embodiment.

The heat-sensitive recording material 10 is processed in a like manner to the first embodiment from a step 150 to a step 158.

After the support drum 30 starts rotation (first turn) in the direction of the arrow B in FIG. 2(C) in the step 158, control for the first heating process (color development process of Y-dye) is performed in a step 200. This color development process of Y-dye is controlled in a like manner to the first embodiment. This embodiment is different from the first one in that the step 200, i.e., the first heating process, carries out the color development process of Y-dye only, and does not heat-process the M-dye layer for its color development.

During the step 200, when the retainer 46 passes the idler roller 60 with an advance of the color development process of Y-dye, the light with wavelength of 400 nm starts to be irradiated from the light source 64 onto the image surface of the heat-sensitive recording material 10 (step 202). The light source 64 continues lighting-up at least immediately before the heating process of the M-dye layer 104.

When the retainer 46 has passed the idler roller 62 after the heating process of the Y-dye layer 106, as shown in FIG. 2(D), a step 204 carries out control for the top/bottom reversing process as follows. More specifically, the latch pawl 52 releases the heat-sensitive recording material 10 from its grasped state, so that the heat-sensitive recording material 10 gets out of the recess 48 by virtue of its own elastic force and advances in the tangential direction of the support drum 30. Moving in the tangential direction, the heat-sensitive recording material 10 is guided by the guide plates 66, 68 to pass therebetween, and then moved toward the feed rollers 72 along the guide plate 70.

As shown in FIG. 2(E), the heat-sensitive recording material 10 held between the pair of feed rollers 72 is once placed on the guide plate 70 by drive power of the feed rollers 72. In this state, the heat-sensitive recording material 10 is located completely away from the support drum 30. In parallel to the above, the support drum 30 is further rotated to its original position (i.e., the position as shown in FIG. 2(A)) and stopped there.

Once the heat-sensitive recording material 10 is stopped, the feed rollers 72 are reversed in rotation so that the heat-sensitive recording material 10 is moved again toward the recess 48 of the support drum 30 with its end, which has been the trailing end in the direction of feeding, now directed ahead, as shown in FIG. 2(F). In a like manner to the above, when the heat-sensitive recording material 10 comes into contact with the actuator 56 of the limit switch 54, the latch pawl 52 is rotated about the shaft 50 in the direction of arrow D in FIG. 2(F) after the elapse of a predetermined time, to thereby grasp the heat-sensitive recording material 10 having advanced into the recess 48. Thus, the heat-sensitive recording material 10 is grasped in such a state that it is turned upside down relative to the state shown in FIG. 2(B).

As shown in FIG. 2(G), the heat-sensitive recording material 10 turned upside down is then subjected to control for the second heating process (color development process of C-dye) in a step 206 as follows. First, the heat-sensitive recording material 10 is fed along the outer circumference of the support drum 30 while being wound around same. As soon as the retainer 46 passes the heating element 42, the thermal head 32 is rotated in the direction of arrow C in FIG. 2(G) to make the heating element 42 contact with the heat-sensitive recording material 10, so that the material 10 is heat-processed in response to the image signal issued from the output port 90. At this time, the image signal is issued conversely in time with respect to that having been issued for the heating process of the Y-dye layer 106. In other words, during the heating process of the C-dye layer 108, the image signal must be reversed in the time relationship for match of the resulting images, because the heat-sensitive recording material 10 has been turned upside down and the direction of feeding thereof has also been reversed relative to the case of heat-processing the Y-dye layer 106. The C-dye layer 108 is thus heat-processed to develop the color of C-dye. The foregoing is the control processed in the step 206. In parallel to the thermal head 32 is rotated oppositely to the direction of the arrow C after the heating process by the heating element 42, the control process goes to a next step 164.

When the retainer 46 has passed the idler roller 62 after the heating process of the C-dye layer 108, a step 208 carries out control for the top/bottom reversing process again (see FIG. 2(D)–2(F)). This control for the top/bottom reversing process is the same as that having been carried in the step 204, and hence the detailed description thereof is omitted here.

After completion of the top/bottom reversing process of the heat-sensitive recording material 10, a step 210 carries out control for the third heating process (color development process of M-dye). More specifically, the amount of heat produced by the heating element 42 is switched to a "strong" level, and the heating process is performed in a like manner to that for the Y-dye layer 106, so that the heat-sensitive recording material 10 is heated in response to the image signal to color-develop only the M-dye layer 104. At this time, the Y-dye in the upper layer exhibits no change in color because it has already been fixed. Also, since there occurs no change in the relative relationship between the heat-sensitive recording material 10 and the support drum 30, the Y- and M-dye images can accurately develop their colors without causing any color shifts.

After completion of the step 210, i.e., after the heating process of all the three colors has been completed, as shown in FIG. 2(H), the steps 164–168 take place in a like manner to the first embodiment, to thereby complete the entire heating process of the heat-sensitive recording material 10.

In this embodiment, as described above, since the image recording sequence proceeds in the order of Y-dye's color development, to top/bottom reversing process, to C-dye's color development, to top/bottom reversing process, and to M-dye's color development, a longer fixing time for the Y-dye layer 106 (i.e., interval until the heating process of the M-dye layer 104) to more certainly ensure that the Y-dye layer 106 will not change its color during the heating process of the underlying M-dye layer 104. Also, where a white base is laminated on the top of the Y-dye layer 106 of the heat-sensitive recording material 10, the longer fixing time makes it possible to fix the white base with certainty.

Further, although the image recording apparatus of the foregoing embodiments employs the rolled heat-sensitive recording material 10 which is cut by the cutter into a predetermined length and then supplied to the apparatus body, i.e., the heat processing section, the heat-sensitive recording material 10 may be supplied by hands sheet by sheet.

Figure 5:
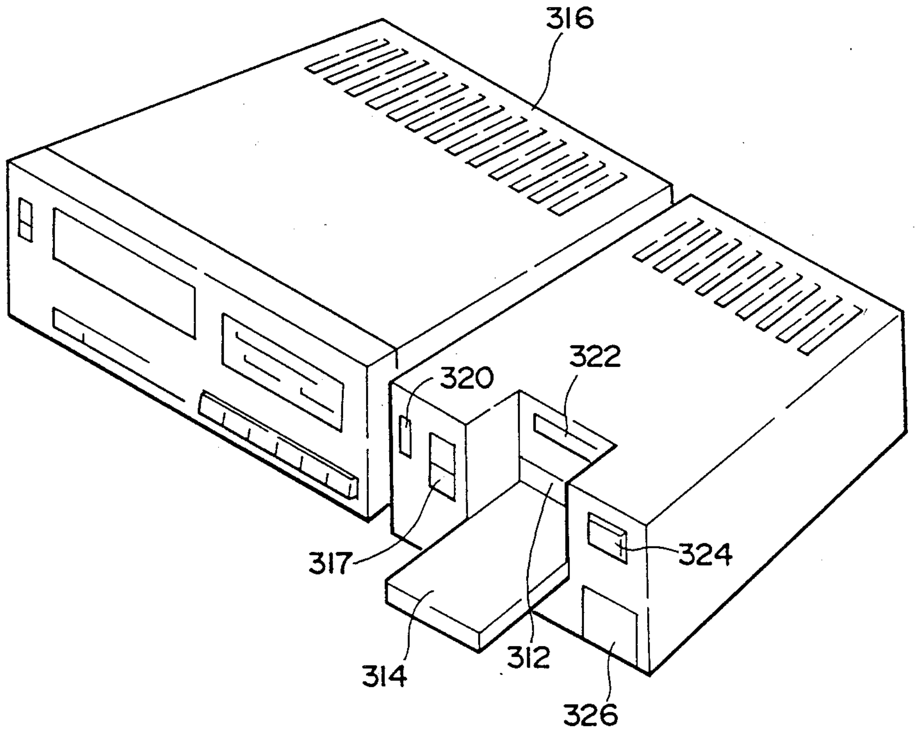
FIG. 5 is a perspective view showing an appearance of an image recording apparatus according to a third embodiment.

FIG. 5 shows the schematic construction of an image recording apparatus according to a third embodiment.

In the front face of the image recording apparatus, there is formed a slit-like feed-in/out port 312 for the heat-sensitive recording material 10, through which the heat-sensitive recording material 10, not yet processed, can be inserted manually by an operator. A tray 314 is extending from the feed-in/out port 312 along the length of the inserted material sheet, i.e., toward the operator standing in front of the apparatus, so that the heat-sensitive recording material 10 may be placed on the tray 314 and then inserted it into the feed-in/out port 312 while sliding over the plane surface of the tray. Further, the heat-sensitive recording material 10 having been heat-processed is discharged through the feed-in/out port 312, and hence the tray 314 also serves as a rest for receiving the heat-sensitive recording material 10 processed and discharged. Incidentally, the tray 314 can be stowed into the apparatus by inserting it toward the feed-in/out port 312 with push.

A VTR 316, for example, is connected to the image recording apparatus, and a image recording signal employed for image recording by a later-described thermal head 332 (see FIG. 6) is created based on an image signal from the VTR 316. Included in other image signal sources connectable to the image recording apparatus is a CCD camera, etc.

On a front panel 317 which includes the feed-in/out port 312, there are also provided a power switch 320, a display 322 for indicating the number of printed sheets, etc., and a print button 324. A sub-cover 126 capable of opening and closing as required is provided below the print button 324, and a set of fine tuning knobs (not shown) for image quality, etc. are installed behind the sub-cover 126.

Figure 6:
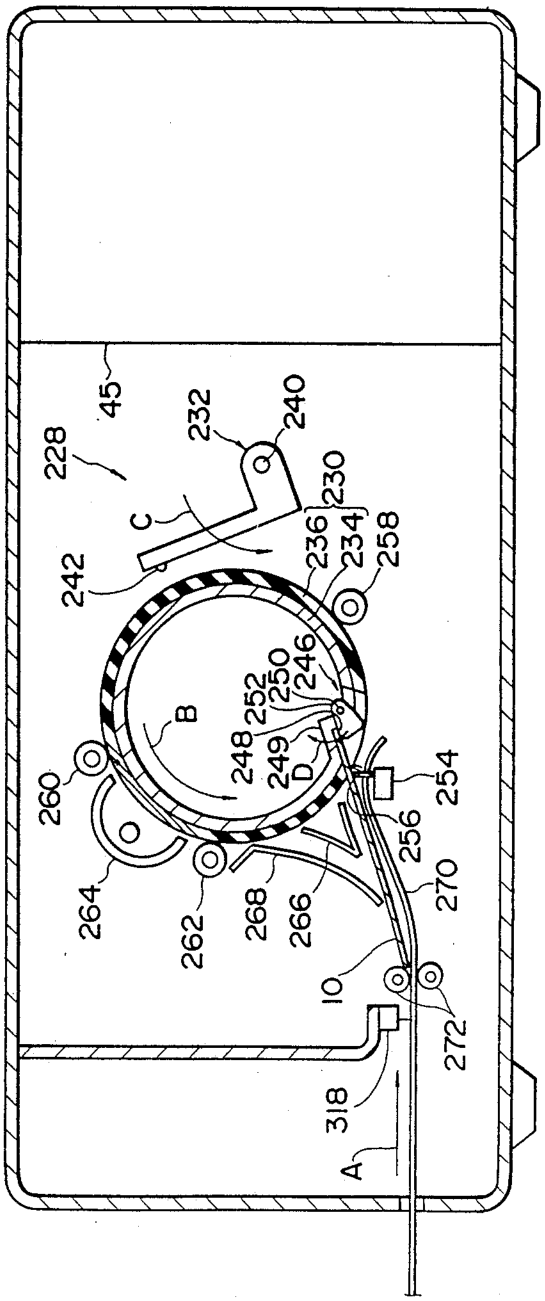
FIG. 6 is a schematic view showing the interior of the image recording apparatus according to the third embodiment.

As shown in FIG. 6, when the heat-sensitive recording material 10 is inserted into the apparatus through the feed-in/out port 312, its leading end is detected by a limit switch 318, and the heat-sensitive recording material 10 is then held between a pair of feed rollers 272 rotated, as a guide and shift means, by drive power from a driver 274 for being fed along a guide plate 270, as a reference guide plate, and guided into a heat processing section 228.

Figure 10:
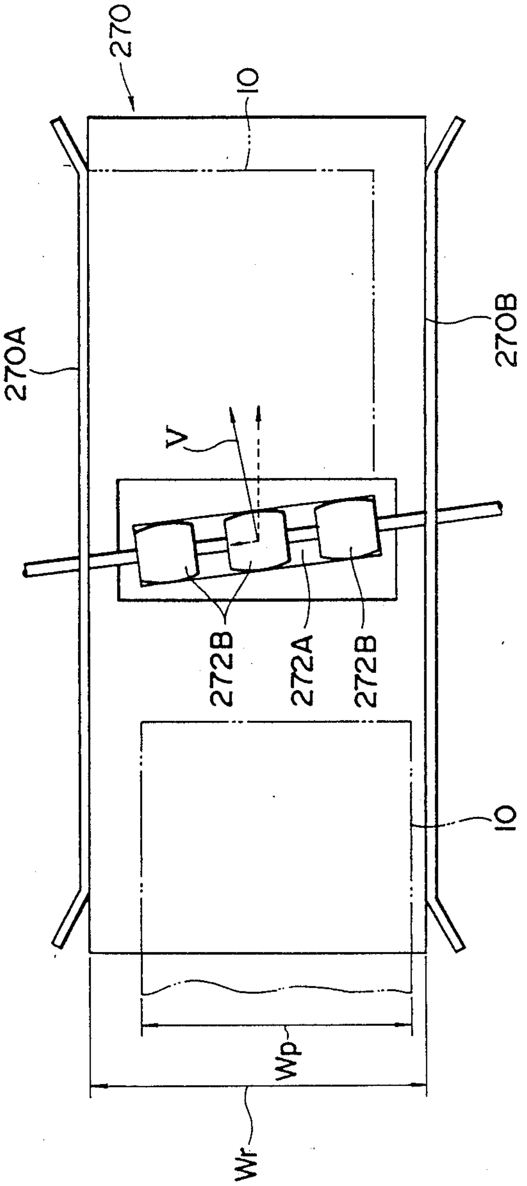
FIG. 10(A) is a plan view of a guide plate 270.
FIG. 10(B) is a perspective view of a feed roller.
Figure 10:
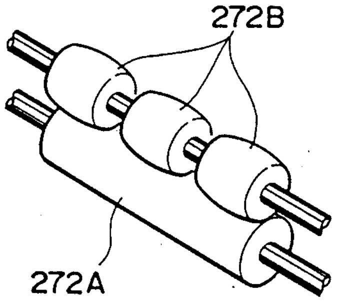

The guide plate 270 includes, as shown in FIG. 10(A), a pair of parallel ribs 270A, 270B extending upwardly from the widthwise opposite side edges to guide the widthwise opposite side edges of the heat-sensitive recording material 10, respectively. The spacing size Wr between the paired ribs 270A and 270B is formed to be slightly larger than the width size Wp of the heat-sensitive recording material 10 for preventing paper from being jammed during feeding of the heat-sensitive recording material 10. However, such an allowance in the widthwise direction may cause widthwise color shifts during recording of the heat-sensitive recording material 10. Therefore, in this embodiment, the feed rollers 272 disposed at an intermediate portion of the guide plate 270 has its axis slightly inclined relative to the widthwise direction of the heat-sensitive recording material 10. With such inclination of the feed rollers 272, the direction of the force (i.e., resultant force of two components indicated by dotted arrows) exerted on the heat-sensitive recording material 10 is given by an arrow V in FIG. 10(A). This forces the heat-sensitive recording material 10 to be contacted with the surface of one rib 270A (reference surface) while running, so that it is always accurately positioned in the widthwise direction.

Here, the paired feed rollers 272 comprises, as shown in FIG. 10(B), a driver roller 272A (i.e., roller contacted with the underside of the heat-sensitive recording material) which is constituted by a usual cylindrical roller made of synthetic resin such as chloroprene rubber), and a driven roller 272B (i.e., roller contacted with the upper side of the heat-sensitive recording material) which is constituted by a plurality of thinner-walled rollers made of polyacetal and arrayed in the axial direction. Each of the thinner-walled rollers has its outer circumferential surface arcuately curved in the axial direction. This reduces the contact area with the heat-sensitive recording material 10 and ensures the positive application of drive power thereto. Accordingly, if the heat-sensitive recording material 10 come into contact with the surface of the rib 270A, as the reference surface, before complete passage thereof through the feed rollers, the heat-sensitive recording material 10 will be slid with respect to the feed rollers, to thereby absorb the component force in the widthwise direction.

Figure 7:
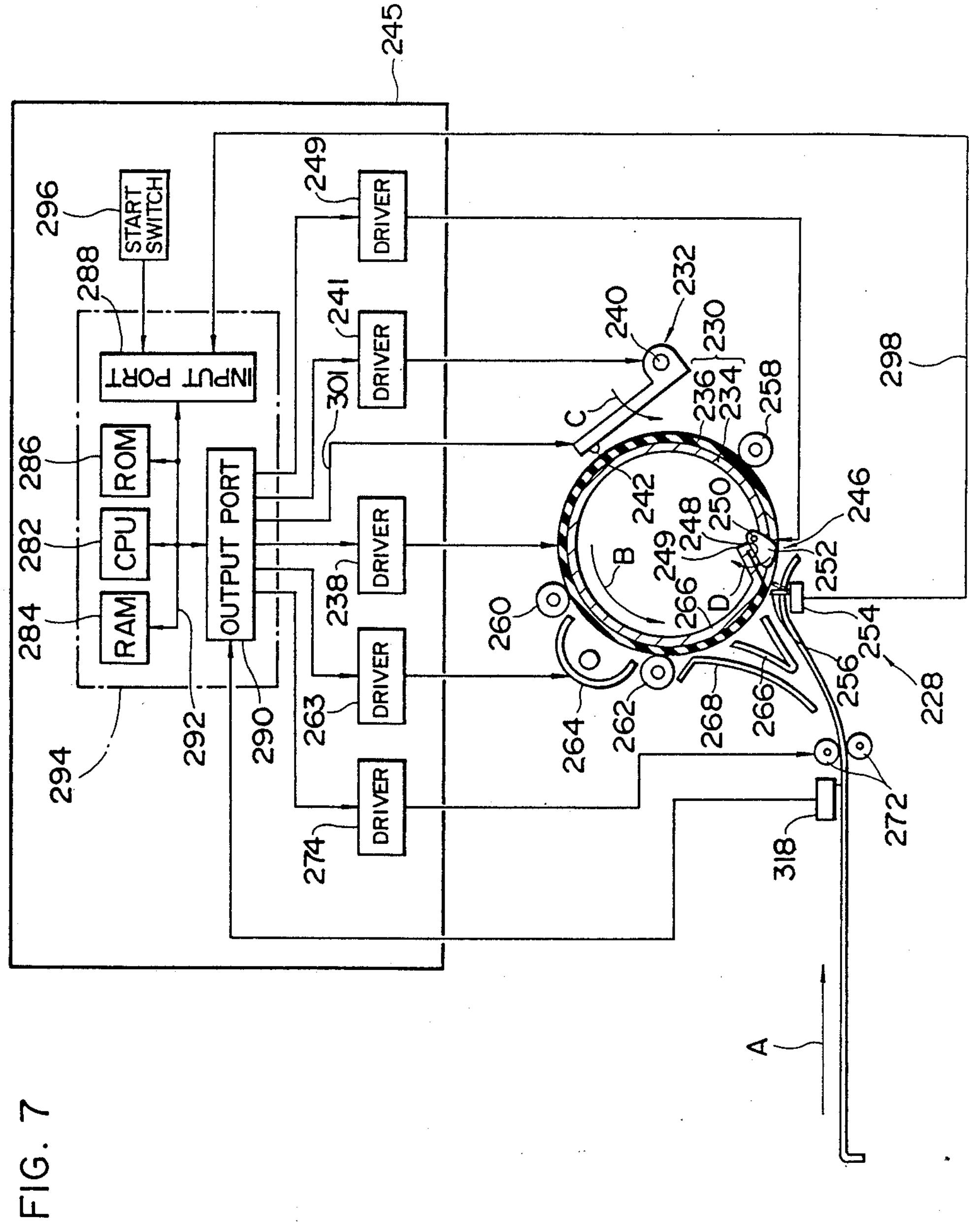
FIG. 7 is a blockdiagram for control of the third embodiment.

As shown in FIG. 7, the heat processing section 228 includes a support drum 230, as a rotatable member, and a thermal head 232 of the line type, as a recording head. The heat-sensitive recording material 10 is heated by the thermal head 232 in the state that it is wound around the support drum 230. The support drum 230 is formed by a cylindrical body 234 of metal, and has an elastic member 236 rolled over the outer circumference thereof. The support drum 230 is rotated at a constant speed by drive power from a driver 238 in the direction of the arrow B in FIG. 6, so that the heat-sensitive recording material 10 wound around the support drum 230 is brought into a position facing the thermal head 232 successively.

The thermal head 232 has its base end pivotally supported to a machine frame (not shown) through a shaft 240, and is rotated about the shaft 240 by drive power from a driver 241 in the direction of the arrow C in FIG. 6 or in the opposite direction, so that a heating element 242 disposed at a distal end of the thermal head 232 is moved into contact with or away from the heat-sensitive recording material 10 wound around the support drum 230. Upon the heating element 242 contacting with the heat-sensitive recording material 10, an image signal 300 is output from a control device 245 to the heating element 242, to thereby form an image on the heat-sensitive recording material 10 under heating in response to the image signal 300.

Having been fed to the heat processing section 228 by the feed rollers 226, the heat-sensitive recording material 10 is now guided in its feed direction by a guide plate 270 for being led to a recess 248 which constitutes a part of a retainer 246 provided in the outer circumference of the support drum 230. In the recess 248, a latch pawl 252 is pivotally supported on a shaft 250 extending parallel to a rotary shaft of the support drum 230, the latch pawl 252 constituting the retainer 246 jointly with the recess 248. At the time the leading end of the heat-sensitive recording material 10 guided by the guide plate 270 gets into the recess 248, the latch pawl 252 is rotated about the shaft 250 by drive power from a driver 249 in the direction of the arrow D in FIG. 6 to grasp the leading end of the heat-sensitive recording material 10. Once grasped by the latch pawl 252, the heat-sensitive recording material 10 is successively wound over the outer circumference of the support drum 230 as it rotates.

The timing, at which the latch pawl 252 grasps the heat-sensitive recording material 10, is determined by a limit switch 254 disposed at an intermediate portion of a feed path of the heat-sensitive recording material 10. More specifically, when the heat-sensitive recording material 10 reaches a position of the limit switch 254, an actuator 256 of the limit switch 254 is interfered with the heat-sensitive recording material 10 to switch the contact (in this embodiment, the limit switch 254 of the normal-open type is employed so that it is turned on upon interference with the heat-sensitive recording material 10). An on (high-level)/ off (low-level) signal from the limit switch 254 is supplied to the control device 245 which triggers control to actuate the latch pawl 252 (i.e., rotate it in the direction of arrow D in FIG. 6) after the elapse of a predetermined time dependent on a feed speed of the heat-sensitive recording material 10 (i.e., after the leading end of the heat-sensitive recording material 10 has struck against the bottom of the recess 248). Thus, the relative positional relationship between the heat-sensitive recording material 10 and the support drum 230 remains constant at all times to ensure accurate positioning of the former, during the state that the heat-sensitive recording material 10 is being grasped by the latch pawl 252.

Around the support drum 230, there are disposed idler rollers 258, 260, 262 in plural positions (three positions in this embodiment). These idler rollers 258, 260, 262 serve, jointly with the support drum 230, to keep the heat-sensitive recording material 10 wound over the outer circumference of the support drum 230 in a close contact state. On the downstream side relative to the heating position of the heat-sensitive recording material 10 by the thermal head 232 in the direction of rotation of the support drum 230, there is disposed a light source 264 (between the idler rollers 260 and 262) connected to the control device 245 through a driver 263 for irradiating light onto the heat-sensitive recording material 10. The light has the wavelength of 400 nm for fixing the Y-dye layer 106 (see FIG. 13) of the heat-sensitive recording material 10. Thus, this embodiment is so arranged as to make the support drum 230 turn twice successively once it starts rotation. During the first turn of the heat-sensitive recording material 10, the Y-dye layer 106 is heat-processed by the thermal head 232 and fixed immediately thereafter.

During the next, i.e., second, turn of the support drum 230, the M-dye layer 104 (see FIG. 13) formed below the Y-dye layer 106 is heat-processed. The amount of heat applied from the heating element 242 is controlled by the control device 245 to be "weak" during the first turn of the support drum 230 to keep the underlying M-dye layer 104 from any heat effects, and "strong" during the second turn thereof.

After the heating process of the Y-dye layer 106 and the M-dye layer 104, the heat-sensitive recording material 10 is released from its grasped state by the retainer 46 and, in a region downstream of the idler roller 262, advanced by virtue of its own elastic force in the tangential direction of the support drum 230 for being guided into between the guide plates 266 and 268. In this connection, the support drum 230 is controlled to be stopped at its initial position (i.e., when the retainer 246 is positioned at the bottom as shown in FIG. 6).

The heat-sensitive recording material 10, moving downwardly while being guided between the guide plates 266 and 268, is now changed its moving direction along a guide plate 270 and held between the pair of feed rollers 272. The feed rollers 272 are rotated by drive power from a driver 274 to transfer the heat-sensitive recording material 10 through a predetermined distance oppositely to the direction of the arrow A in FIG. 6, and thereafter are reversed in rotation to transfer the heat-sensitive recording material 10 toward the support drum 230 (in the direction of the arrow A in FIG. 6) with the trailing end of the material 10 now directed ahead. Thus, the heat-sensitive recording material 10 is turned upside down and grasped again by the retainer 246. In this grasped state, the heat-sensitive recording material 10 is rotated together with the support drum 230 to heat-process the C-dye layer 108 (see FIG. 13) by the thermal head 232. After the heating process of the C-dye layer 108, the retainer 246 is controlled to release the heat-sensitive recording material 10 from its grasped state at the point in time when the material 10 has passed the guide plate 262, so that the heat-sensitive recording material 10 is guided into between guide plates 266 and 268 and led to the feed-in/out port 312.

The control device 245 includes a microcomputer 294 comprising a CPU 282, RAM 284, ROM 286, input port 288, output port 290, and buses 292 such as data buses and control buses interconnecting those components. The print button 324 and the limit switch 318 are connected to the input port 288. Operation of the print button 324 and detection of the heat-sensitive recording material 10 by the limit switch 318 start a series of heat processing steps. A signal line 298 from the aforesaid limit switch 254 is also connected to the input port 288.

Connected to the output port 290 are the support drum 230, thermal head 232, latch pawl 252, light source 264, and feed rollers 272 through the drivers 238, 241, 249, 263 and 274, respectively, for being controlled in their operations. The signal line 300 for supplying the image signal to the thermal head 232 is also connected to the output port 290.

Operation of this embodiment will be described below with reference to FIGS. 8(A)–8(H) which are explanatory views for the heating process and FIG. 9 which shows a flowchart for control thereof.

Figure 8:
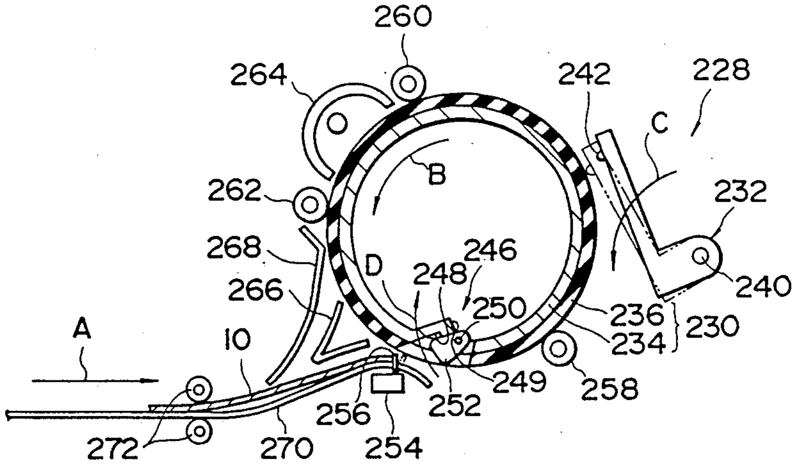
FIGS. 8(A)–8(H) are explanatory views showing successive steps of the heating process according to the third embodiment.
Figure 8:
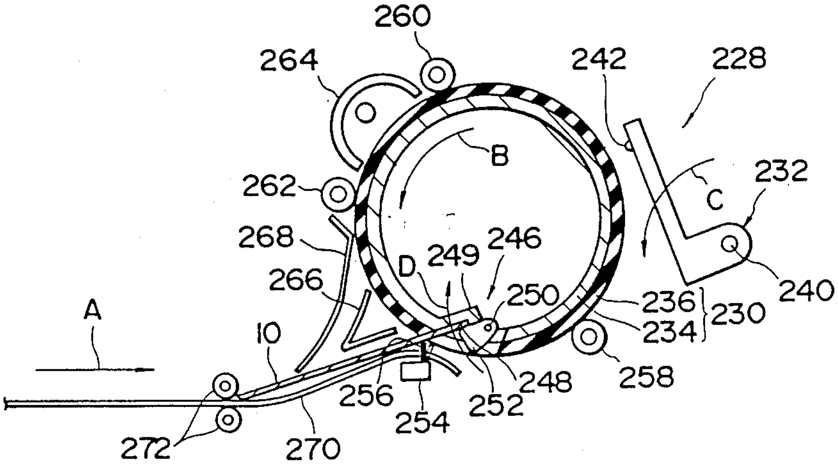
Figure 8:
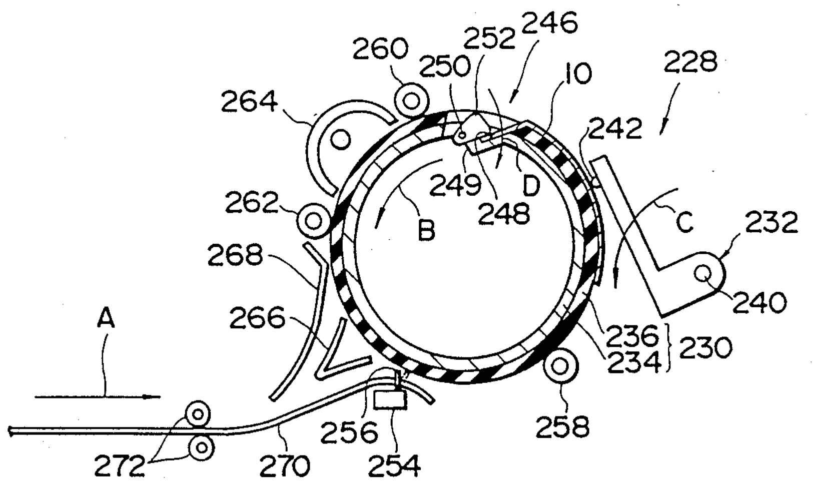
Figure 8:
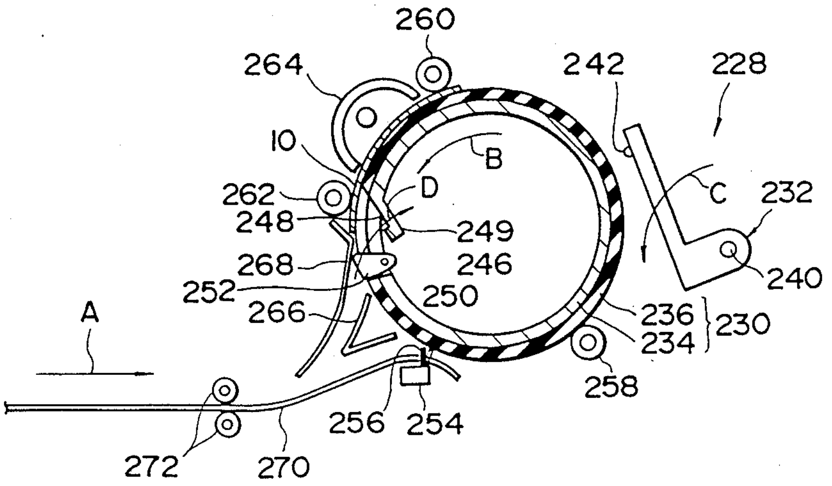
Figure 8:
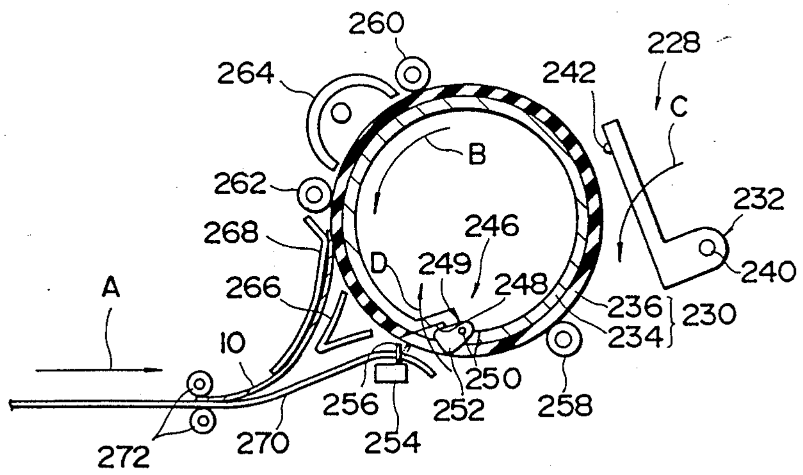
Figure 8:
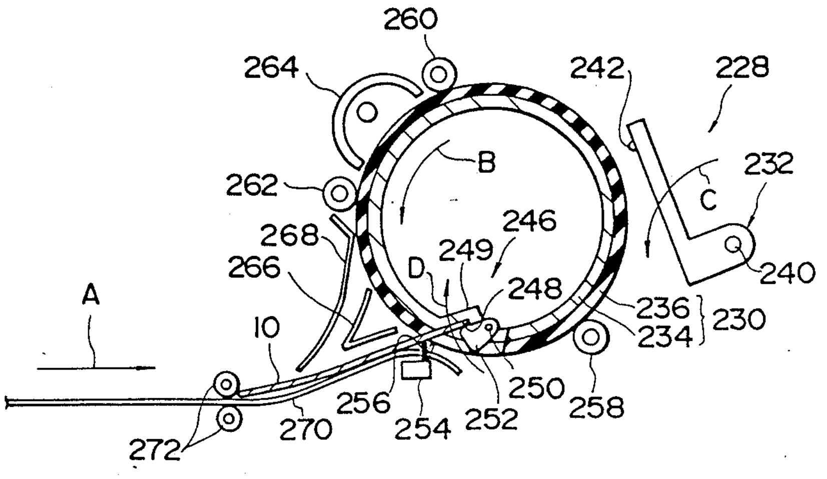
Figure 8:
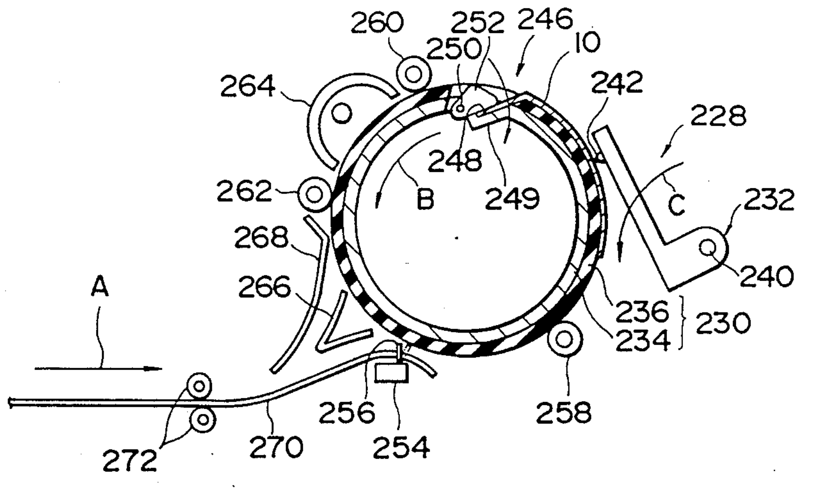
Figure 8:
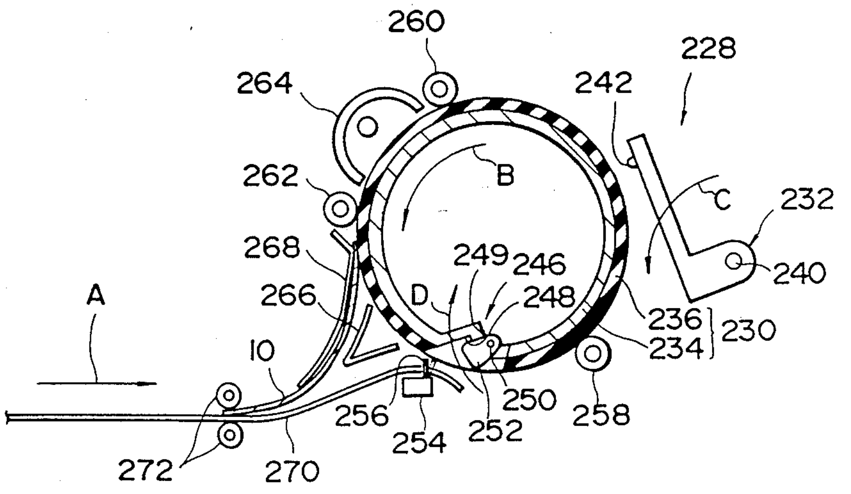
Figure 9:
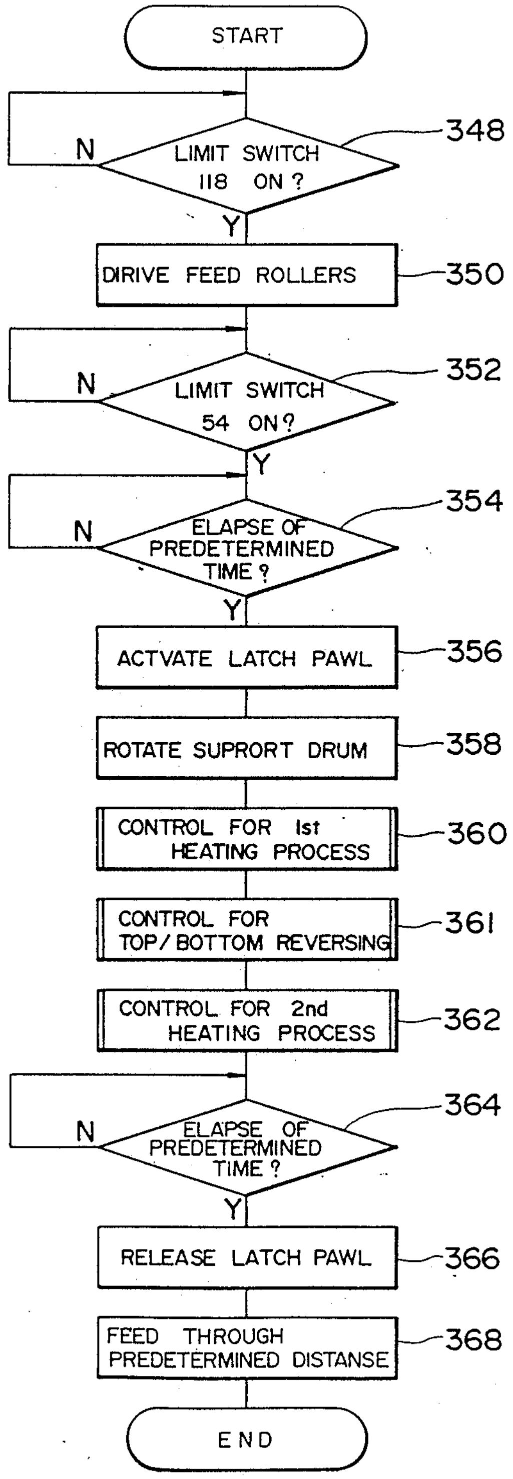
FIG. 9 is a flowchart for control of the third embodiment.

After depressing the print button 324, as shown in FIG. 8(A), the heat-sensitive recording material 10 (see the position indicated by solid lines in FIG. 8(A)) is inserted through the feed-in/out port 312 and advanced while being guided by the guide plate 270. Upon the limit switch 318 turning on in a step 348, the feed rollers 272 starts rotation to feed the heat-sensitive recording material 10 through a predetermined distance in a step 350. Incidentally, if the print button 324 is not yet depressed, the feed rollers 272 will not start rotation even upon the limit switch 318 turning on. In this case, the feed rollers 272 starts rotation after waiting for depression of the print button 324.

Once the feed rollers 272 are rotated to feed the heat-sensitive recording material 10 while holding it therebetween, as shown in FIG. 10(A), the heat-sensitive recording material 10 held between the driver roller 272A and the driven roller 272B is now subjected to the force acting in the direction of the arrow V, because the feed rollers 272 have their axes inclined slightly. While being held and transferred between the paired feed rollers 272, therefore, the heat-sensitive recording material 10 is forced to contact with the surface of the rib 270A, as the reference surface, so that it is fed while keeping match in the widthwise direction at all times. As a result, the colors developed through the respective heat processing steps by the thermal head 232 will not shift in the widthwise direction.

When the heat-sensitive recording material 10 reaches the position indicated by an imaginary line in FIG. 8(A), it comes into contact with the actuator 256 of the limit switch 254. Here, a step 352 determines as to whether or not the limit switch 254 has been turned on. In response to turning-on of the limit switch 254, a high-level signal is applied to the input port 288.

In a next step 354, it is determined whether or not a predetermined time has elapsed after the above input of the high-level signal. If so, the the latch pawl 252 is rotated in the direction of the arrow D as shown in FIG. 8(B) (step 356). During the elapse of the predetermined time, the heat-sensitive recording material 10 gets into the recess 248 of the support drum 230 such that its leading end is brought into abutment with a stopper 249 for being positively grasped the latch pawl 252.

After the leading end of the heat-sensitive recording material 10 has been grasped by the latch pawl 252, as shown in FIG. 8(C), the support drum 230 starts rotation in a step 358 in the direction of arrow B in FIG. 8(C) (i.e., first turn). A next step 360 carries out control for the first heating process as follows. More specifically, when the retainer 246 has passed the heating element 242 of the thermal head 232, a drive signal is issued from the output port 290 through the driver 241 to rotate the thermal head 232 about the shaft 240 in the direction of the arrow C in FIG. 8(C), thereby making the heating element 242 contact with the heat-sensitive recording material 10. Thereafter, the support drum 230 is rotated with the heating element 242 kept contact with the heat-sensitive recording material 10, and the image signal is output to the heating element 242 successively in match with the continued rotation of the support drum 230.

At this time, the heating element 242 is set to produce the "weak" amount of heat for heating the heat-sensitive recording material 10 in response to the image signal so that only the Y-dye layer 106 is color-developed. After the heating process by the heating element 242, the thermal head 232 is rotated about shaft 240 oppositely to the direction of the arrow C in FIG. 8(C), causing the heating element 242 to move away from the heat-sensitive recording material 10.

When the retainer 246 has passed the idler roller 260, the light with wavelength of 400 nm is irradiated from the light source 264 onto the image surface of the heat-sensitive recording material 10. The Y-dye layer 106 is thereby fixed and remains unchanged in color since then even under subsequent heating.

After completion of the first turn, the support drum 230 continuously enters the second turn for heat-processing the M-dye layer 104. More specifically, except that the amount of heat produced by the heating element 242 is switched to a "strong" level, the heating process takes place in a like manner to that for the Y-dye layer 106, so that the heat-sensitive recording material 10 is heated in response to the image signal to color-develop only the M-dye layer 104. At this time, the Y-dye in the upper layer exhibits no change in color because it has already been fixed. Also, since there occurs no change in the relative positional relationship between the heat-sensitive recording material 10 and the support drum 230, the Y-dye and M-dye images can accurately develop their colors without causing any color shifts.

After the heating process of the M-dye layer, the heat-sensitive recording material 10 passes the irradiation position from the light source 264. But, the light source 264 only serves to fix the Y-dye layer, so it may be lit on or off at this time. Preferably, the light source 264 is lit off for energy saving.

When the retainer 246 has passed the idler roller 262 after the heating process of the Y-dye and M-dye layers during two turns of the support drum 230, as shown in FIG. 8(D), a step 361 carries out control for the top/-bottom reversing process as follows. More specifically, the latch pawl 252 releases the heat-sensitive recording material 10 from its grasped state, so that the heat-sensitive recording material 10 gets out of the recess 248 by virtue of its own elastic force and advances in the tangential direction of the support drum 230. While moving in the tangential direction, the heat-sensitive recording material 10 is guided by the guide plates 266, 268 to pass therebetween, and then moved toward the feed rollers 272 along the guide plate 270.

As shown in FIG. 8(E), the heat-sensitive recording material 10 held between the pair of feed rollers 272, now rotating in the backward direction, is once placed on the guide plate 270 by drive power of the feed rollers 272. In this state, the heat-sensitive recording material 10 is located completely away from the support drum 230. In parallel to the above, the support drum 230 is further rotated to its original position (i.e., the position as shown in FIG. 8(A)) and stopped there.

Once the heat-sensitive recording material 10 is stopped, the feed rollers 272 are rotated in the forward direction so that the heat-sensitive recording material 10 is moved again toward the recess 248 of the support drum 230 with its end, which has been the trailing end in the direction of feeding, now directed ahead, as shown in FIG. 8(F). At this time too, since the end of the heat-sensitive recording material is transferred while being so guided as to contact with the rib 270A, the color-developed positions of the Y-dye and M-dye layers can be matched with that of the C-dye layer subsequently heat-processed.

In a like manner to the above, when the heat-sensitive recording material 10 comes into contact with the actuator 256 of the limit switch 254, the latch pawl 252 is rotated about the shaft 250 in the direction of arrow D in FIG. 8(F) after the elapse of a predetermined time, to thereby grasp the heat-sensitive recording material 10 having advanced into the recess 248. Thus, the heat-sensitive recording material 10 is grasped in such a state that it is turned upside down relative to the state shown in FIG. 8(B).

As shown in FIG. 8(G), the heat-sensitive recording material 10 turned upside down is then subjected to control for the second heating process in a step 362 as follows. First, the heat-sensitive recording material 10 is fed along the outer circumference of the support drum 230 while being wound around same. As soon as the retainer 246 passes the heating element 242, the thermal head 232 is rotated in the direction of the arrow C in FIG. 8(G) to make the heating element 242 contact with the heat-sensitive recording material 10, so that the material 10 is heat-processed in response to the image signal issued from the output port 290. At this time, the image signal is issued conversely in time with respect to that having been issued for the heating process of the Y-dye layer 106 and the M-dye layer 104. In other words, during the heating process of the C-dye layer 108, the image signal must be reversed in the time relationship for match of the resulting images, because the heat-sensitive recording material 10 has been turned upside down and the direction of feeding thereof has also been reversed relative to the case of heat-processing the Y-dye layer 106 and the M-dye layer 104. The C-dye layer 108 is thus heat-processed to develop the color of C-dye. The foregoing is the control processed in the step 362. In parallel to that the thermal head 232 is rotated oppositely to the direction of the arrow C after the heating process by the heating element 42, the control process goes to a next step 364.

Upon the elapse of a predetermined time after the heating element 242 of the thermal head 232 has been moved away from the heat-sensitive recording material 10 (step 364), as shown in FIG. 8(H), the retainer 246 having passed the idler roller 262 releases the heat-sensitive recording material 10 from its grasped state in a step 366, allowing the material 10 to be fed into between the guide plates 266 and 268 as the support drum 230 rotates.

After moving between the guide plates 266 and 268, the heat-sensitive recording material 10 is held between the pair of feed rollers 272, not rotated in the backward direction, and then fed by the feed rollers 272 through a predetermined distance in a step 368 for being sent out to the feed-in/out port 312. The entire heating process of one sheet of heat-sensitive recording material 10 is thereby completed.

With this embodiment, as described above, since the single port is commonly used as a feed-in port and a feed-out port for the heat-sensitive recording material 10, the entire apparatus becomes compact, and the heat-sensitive recording material 10 can be handled only on the front side, resulting in good operability. Also, since the guide plate 270 extending from the feed-in/out port 312 toward the heat processing section is employed as a rest place for temporarily receiving the heat-sensitive recording material 10 during the top/bottom reversing process, it is not required to provide a specific guide plate.

Although in this embodiment the guide plate 270 is employed commonly for all the feed-in path, feed-out path and the temporary feed path during the top/bottom reversing process of the heat-sensitive recording material 10, the apparatus can be made compact even with the arrangement of commonly using any two among the feed-in path, feed-out path and the temporary feed path during the top/bottom reversing process.

Figure 11:
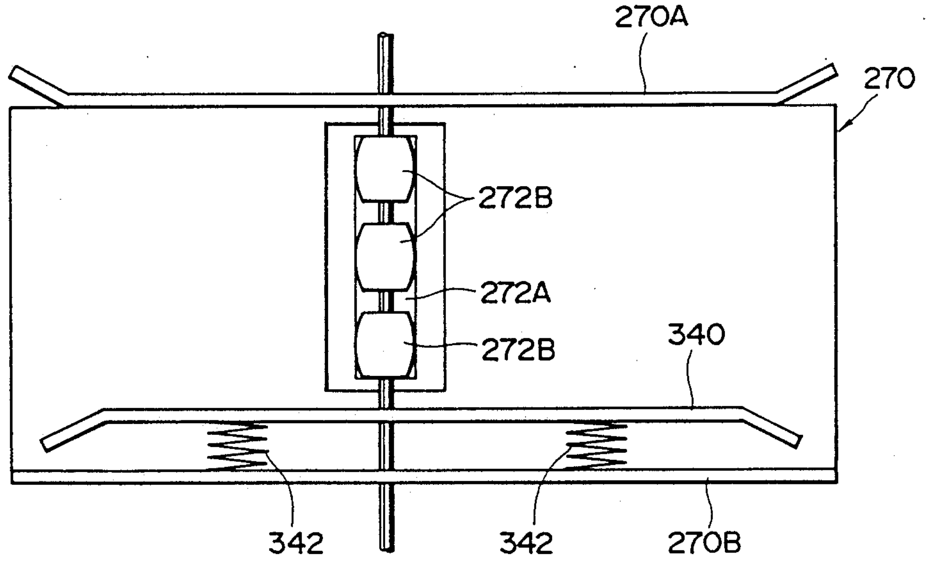
FIG. 11 is a plan view of the guide plate where a movable plate is used as movable means for guide.

Furthermore, although in this embodiment the axes of the feed rollers 272 are inclined with respect to the widthwise direction to provide one guide and shift means, so that one widthwise side edge of the heat-sensitive recording material 10 is brought into contact with the reference surface under the action of the component force caused by rotation of the feed rollers 272, any other type of guide and shift means may be practiced. For example, as shown in FIG. 11, a movable plate 340 is attached in parallel to the rib 270B through compression springs 342, causing the heat-sensitive recording material 10 to contact with the rib 270A, as the reference surface, by the bias of the compression springs 342. In this modification, the feed rollers 272 may have the axes parallel to the widthwise direction.

Next, a fourth embodiment of the present invention will be described with reference to FIGS. 12(A)–12(C).

Figure 12:
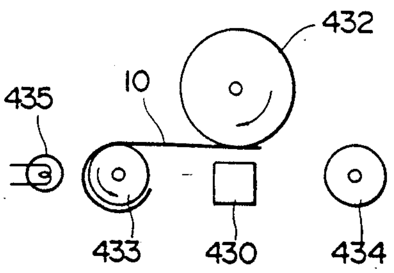
FIGS. 12(A)–12(C) are explanatory views showing operation of an image recording apparatus according to a fourth embodiment.
Figure 12:
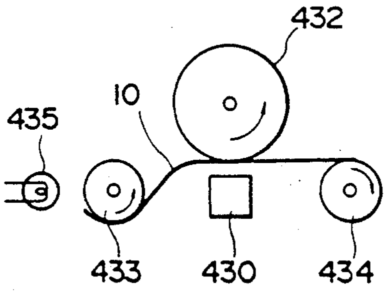
Figure 12:
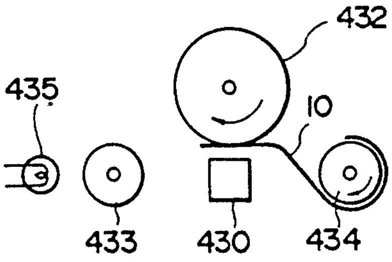

As shown in FIG. 12(A), the heat-sensitive recording material 10 fed from a roll 434 to a recording (support) drum 432 is heated by a thermal head 430 for heat-processing the Y-dye layer 106, and then fed to a roll 433 where the Y-dye layer 106 is fixed by means of a light source 435. Thereafter, as shown in FIG. 12(B), the heat-sensitive recording material 10 is fed to the recording drum 432 again, but now turned upside down, for heat-processing the C-dye layer 108. After the heating process of the C-dye layer, as shown in FIG. 12(C), the heat-sensitive recording material 10 is transferred to the drum 434 and then fed back to the recording roll 432, but again turned upside down, for heat-processing the M-dye layer 104. The color development process for all of the dye layers is thereby completed.

What is claimed is:

1. An image recording apparatus for recording an image on a heat-sensitive recording material having at least one sort of color developing layer on each of both sides of a transparent support member, comprising:

recording means for heat-processing each said color developing layer on said heat-sensitive recording material to develop a color; and reversing means for turning said heat-sensitive recording material upside down.

2. An image recording apparatus according to claim 1, further comprising support means located in opposition to said recording means for supporting said heat-sensitive recording material at the time of heat-processing by said recording means.

3. An image recording apparatus according to claim 2, wherein said support means comprises a rotatable member for supporting said heat-sensitive recording material wound around said rotatable member.

4. An image recording apparatus according to claim 3, further comprising feed means for feeding said heat-sensitive recording material to said rotatable member.

5. An image recording apparatus according to claim 4, wherein said feed means comprises a reference guide plate which has a widthwise reference surface facing one widthwise side edge of said heat-sensitive recording material during feeding of said heat-sensitive recording material toward said rotatable member, and guide and shift means for guiding and shifting said heat-sensitive recording material during feeding of said heat-sensitive recording material toward said rotatable member, such that the widthwise side edge of said heat-sensitive recording material near said reference guide plate becomes aligned with the reference surface of said reference guide plate.

6. An image recording apparatus according to claim 5, wherein said guide and shift means includes a roller for guiding said heat-sensitive recording material during feeding of said heat-sensitive recording material in the direction in which said widthwise side edge comes into abutment with said reference guide plate.

7. An image recording apparatus according to claim 5, wherein said guide and shift means comprises presser means for pressing said heat-sensitive recording material in the widthwise direction such that said widthwise side edge of said heat-sensitive recording material comes into abutment with said reference guide plate.

8. An image recording apparatus according to claim 3, further comprising fixing means located in opposition to the outer circumference of said rotatable member for fixing with light said color developing layer having been color-developed by said recording means.

9. An image recording apparatus according to claim 3, wherein said reversing means is arranged to temporarily take away said heat-sensitive recording material from said rotatable member, and accommodate said heat-sensitive recording material into an accommodation position, thereby turning said heat-sensitive recording material upside down.

10. An image recording apparatus according to claim 9, further comprising a first guide path for guiding said heat-sensitive recording material toward said rotatable member, a second guide path for guiding said heat-sensitive recording material taken away from said rotatable member toward said accommodation position during the top/bottom reversing step of said heat-sensitive recording material, and a third guide path for taking away said heat-sensitive recording material from said rotatable member and discharging same after the heating process of said heat-sensitive recording material, at least two of said first, second and third guide paths being used in common.

11. An image recording apparatus for recording an image on a heat-sensitive recording material having on both sides of a sheet-like transparent support member a plurality of transparent heat-sensitive color developing layers that develop colors different from each other, comprising:

a rotatable member around the outer circumference of which said heat-sensitive recording material is wound;

a recording head located in opposition to the outer circumference of said rotatable member for heat-processing said transparent heat-sensitive color developing layers on said heat-sensitive recording material, wound around said rotatable member, to develop respective color; and reversing means for once taking away said heat-sensitive recording material from said rotatable member and turning said heat-sensitive recording material upside down.

12. An image recording apparatus according to claim 11, further comprising control means for operating said recording head to color-develop said transparent heat-sensitive color developing layer on the outer side of said heat-sensitive recording material so wound around said rotatable member as to expose either one side to the outside, for operating said reversing means to turn said heat-sensitive recording material upside down, and for operating said recording head to color-develop said transparent heat-sensitive color developing layer on the outer side of said heat-sensitive recording material now so wound around said rotatable member as to expose the other side to the outside.

13. An image recording apparatus according to claim 11, further comprising fixing means located in opposition to the outer circumference of said rotatable member for fixing with light said transparent heat-sensitive color developing layers having been color-developed.

14. An image recording apparatus according to claim 13, wherein said transparent heat-sensitive color developing layer applied on one side of said transparent support member comprises a first layer positioned near said transparent support member and a second layer positioned on said first layer, said first and second layers capable of developing respective colors different from each other, and wherein said image recording apparatus further comprises control means for operating said recording head to heat-process and color-develop said second layer of said transparent heat-sensitive color developing layer on one side of said heat-sensitive recording material so wound around said rotatable member as to expose one side to the outside, for operating said fixing means to fix said color-developed second layer, for operating said recording head to heat-process and color-develop said first layer, for operating said reversing means to take away said heat-sensitive recording material from said rotatable member and turning same upside down, and for operating said recording head to heat-process and color-develop said transparent heat-sensitive color developing layer on the other side of said heat-sensitive recording material now so wound around said rotatable member as to expose the other side to the outside.

15. An image recording apparatus according to claim 13, wherein said transparent heat-sensitive color developing layer applied on one side of said transparent support member comprises a first layer positioned near said transparent support member and a second layer positioned on said first layer, said first and second layers capable of developing respective colors different from each other, and wherein said image recording apparatus further comprises control means for operating said recording head to heat-process and color-develop said second layer of said transparent heat-sensitive color developing layer on one side of said heat-sensitive recording material so wound around said rotatable member as to expose one side to the outside, for operating said fixing means to fix said color-developed second layer, for operating said reversing means to take away said heat-sensitive recording material from said rotatable member and turning same upside down, for operating said recording head to heat-process and color-develop said transparent heat-sensitive color developing layer on the other side of said heat-sensitive recording material now so wound around said rotatable member as to expose the other side to the outside, for operating said reversing means to take away said heat-sensitive recording material from said rotatable member and turning same upside down, and for operating said recording head to heat-process and color-develop said first layer of said transparent heat-sensitive color developing layer on one side of said heat-sensitive recording material again so wound around said rotatable member as to expose one side to the outside.

16. An image recording apparatus according to claim 13, further comprising feed means for feeding said heat-sensitive recording material to said rotatable member.

17. An image recording apparatus according to claim 16, wherein said feed means comprises a reference guide plate which has a widthwise reference surface facing one widthwise side edge of said heat-sensitive recording material during feeding of said heat-sensitive recording material toward said rotatable member, and guide and shift means for guiding and shifting said heat-sensitive recording material during feeding of said heat-sensitive recording material toward said rotatable member, such that the widthwise side edge of said heat-sensitive recording material near said reference guide plate becomes aligned with the reference surface of said reference guide plate.

18. An image recording apparatus according to claim 11, wherein said reversing means is arranged to temporarily take away said heat-sensitive recording material from said rotatable member, and accommodate said heat-sensitive recording material into an accommodation position, thereby turning said heat-sensitive recording material upside down.

19. An image recording apparatus according to claim 18, further comprising a first guide path for guiding said heat-sensitive recording material toward said rotatable member, a second guide path for guiding said heat-sensitive recording material taken away from said rotatable member toward said accommodation position during the top/bottom reversing step of said heat-sensitive recording material, and a third guide path for taking away said heat-sensitive recording material from said rotatable member and discharging same after the heating process of said heat-sensitive recording material, at least two of said first, second and third guide paths being used in common.

20. An image recording method of recording an image by a single recording head on a heat-sensitive recording material which has a first transparent heat-sensitive color developing layer and a second transparent heat-sensitive color developing layer formed on said first transparent heat-sensitive color developing layer on one side of a transparent support member and a third transparent heat-sensitive color developing layer formed on the other side of said transparent support member, comprising the steps of:

placing said one side of said transparent support member opposite to said recording head for heat-processing said second transparent heat-sensitive color developing layer:

irradiating light of predetermined wavelength onto said heat-sensitive recording material to fix the developed color of said second transparent heat-sensitive color developing layer;

reversing said heat-sensitive recording material upside down while continuing the irradiation of said light, to place said the other side of said transparent support member opposite to said recording head for heat-processing said third transparent heat-sensitive color developing layer; and reversing said heat-sensitive recording material upside down again after the heating process of said third transparent heat-sensitive color developing layer, to place said one side of said transparent support member opposite to said recording head for heat-processing said first transparent heat-sensitive color developing layer.

* * * * *